(12) United States Patent
Yang et al.

(10) Patent No.: US 11,806,696 B2
(45) Date of Patent: Nov. 7, 2023

(54) SILICOALUMINOPHOSPHATE MOLECULAR SIEVE, ITS PREPARATION AND APPLICATION THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Weimin Yang, Shanghai (CN); Zhiqing Yuan, Shanghai (CN); Jiawei Teng, Shanghai (CN); Wenhua Fu, Shanghai (CN); Songlin Liu, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY SINOPEC, Shanghai (CN)

( * ) Notice: Subject to any disclaimer, the term of this patent is extended or adjusted under 35 U.S.C. 154(b) by 344 days.

(21) Appl. No.: 17/288,889

(22) PCT Filed: Sep. 19, 2019

(86) PCT No.: PCT/CN2019/106608
§ 371 (c)(1),
(2) Date: Apr. 26, 2021

(87) PCT Pub. No.: WO2020/082943
PCT Pub. Date: Apr. 30, 2020

(65) Prior Publication Data
US 2022/0001366 A1    Jan. 6, 2022

(30) Foreign Application Priority Data

Oct. 25, 2018  (CN) .......................... 201811250864.3

(51) Int. Cl.
| | | |
|---|---|---|
| *B01J 29/85* | (2006.01) | |
| *C01B 37/08* | (2006.01) | |
| *B01J 20/02* | (2006.01) | |
| *B01J 37/04* | (2006.01) | |
| *B01J 37/06* | (2006.01) | |
| *B01J 37/08* | (2006.01) | |
| *C01B 39/54* | (2006.01) | |

(52) U.S. Cl.
CPC .......... *B01J 29/85* (2013.01); *B01J 20/0292* (2013.01); *B01J 37/04* (2013.01); *B01J 37/06* (2013.01); *B01J 37/082* (2013.01); *C01B 39/54* (2013.01); *C01P 2002/72* (2013.01)

(58) Field of Classification Search
None
See application file for complete search history.

(56) References Cited

U.S. PATENT DOCUMENTS

| | | |
|---|---|---|
| 4,310,440 A | 1/1982 | Wilson et al. |
| 4,440,871 A | 4/1984 | Lok et al. |
| 4,752,651 A | 6/1988 | Kaiser |
| 2003/0129128 A1 | 7/2003 | Strohmaier et al. |
| 2003/0232006 A1 | 12/2003 | Cao et al. |
| 2005/0090390 A1 | 4/2005 | Venkatathri et al. |
| 2006/0292053 A1 | 12/2006 | Mertens et al. |
| 2008/0108857 A1 | 5/2008 | Wilson |

FOREIGN PATENT DOCUMENTS

| | | |
|---|---|---|
| CN | 1391532 A | 1/2003 |
| CN | 104556092 A | 4/2015 |
| CN | 106608632 A | 5/2017 |
| EP | 2085360 A1 | 8/2009 |
| RU | 2214441 C2 | 10/2003 |
| RU | 2593989 C2 | 8/2016 |
| RU | 2662821 C2 | 7/2018 |
| TW | 583140 B | 4/2004 |
| WO | 1998015496 A1 | 4/1998 |
| WO | 2010142448 A2 | 12/2010 |
| WO | 2017095705 A1 | 6/2017 |
| WO | 2018152829 A1 | 8/2018 |

OTHER PUBLICATIONS

Saif, Muhammad Jawwad et al.; "Novel bis-piperidinium and bis-pyrrolidinium compounds as versatile phase-transfer catalysts"; General Paper ARKIVOC 2010(xi); Jan. 1, 2010; pp. 133-145.
Russian Patent Office Action; Russian Patent Application No. 2021114310; Filed on Sep. 19, 2019.
Flanigen E. M. et al.; Phosphorus Substitution in Zeolite Frameworks; Molecular Sieve Zeolites-I, Sep. 8, 1970, pp. 76-98, ACS, Washington D.C.

*Primary Examiner* — Sheng H Davis
(74) *Attorney, Agent, or Firm* — NKL Law; Allen Xue

(57) ABSTRACT

A novel silicoaluminophosphate molecular sieve has a schematic chemical composition, expressed on a molar basis, of $mSiO_2 \cdot Al_2O_3 \cdot nP_2O_5$, in which m represents the molar ratio of $SiO_2$ to $Al_2O_3$ and is in a range of about 0.005-0.15, and n represents the molar ratio of $P_2O_5$ to $Al_2O_3$ and is in a range of about 0.7-1.1. The silicoaluminophosphate molecular sieve has a unique X-ray diffraction pattern, and can be used as an adsorbent, a catalyst or a catalyst carrier.

19 Claims, 2 Drawing Sheets

SILICOALUMINOPHOSPHATE MOLECULAR SIEVE, ITS PREPARATION AND APPLICATION THEREOF

TECHNICAL FIELD

The present application relates to the technical field of molecular sieves, in particular to a silicoaluminophosphate molecular sieve, its preparation and application thereof.

BACKGROUND ART

Molecular sieves are a family of porous, crystalline materials, and over 250 types of molecular sieves with known structures have been discovered to date. Most molecular sieves have large internal specific surface areas and open internal spaces that serve as sites for reactions and for holding guest molecules, such as metals, metal oxides, organic molecules, water molecules, and the like. Since molecular sieves have uniform and regular pore channels, and the size of the pore channels is in the same order of magnitude as that of molecules, the entrance and exit of the molecules can be selected, and thus a shape selection effect can be obtained. Because of the above characteristics, molecular sieves are widely used as catalysts, carriers of catalysts, adsorbents, detergents and the like, and are widely applied in the fields of petrochemical industry, environmental protection, adsorption and separation.

The framework of molecular sieves is typically made up of coordinated tetrahedrons ($TO_4$) joined at a common vertex (normally the oxygen atom. For aluminophosphate molecular sieves, the framework of this type of molecular sieve is formed by connecting $AlO_4^-$ tetrahedrons and $PO_4^+$ tetrahedrons, so that the entire molecular sieve framework appears electrically neutral. Of course, similar to zeolite, aluminum or phosphorus in aluminophosphate molecular sieves can be replaced by other elements, most commonly silicon (the resulting molecular sieve is referred to as SAPO) and transition metal elements (the resulting molecular sieve is referred to as MAPO), and the introduction of these elements endows the aluminophosphate molecular sieves with new characteristics, such as solid acidity or redox properties, etc. The artificial synthesis studies of aluminophosphate molecular sieves are relatively late compared to zeolite molecular sieves.

In 1971, Flanigen et al reported the synthesis of aluminophosphate molecular sieves [Flanigen E. M. and Grose R. W., Phosphorus Substitution in Zeolite Frameworks. in Molecular Sieve Zeolites-I, 1970, P76-P98, ACS, Washington D.C.], which comprises mixing oxides of aluminum, silicon and phosphorus under hydrothermal synthesis conditions, and produces silicoaluminophosphate molecular sieves having the same crystal structure as analcime, chabazite, phillipsite-harmotome, zeolite L, A, and B, etc., where the phosphorus content is 5-25% (calculated as $P_2O_5$), but no structure different from that of zeolite is found.

U.S. Pat. No. 4,310,440 describes the hydrothermal synthesis of a series of aluminophosphate molecular sieves using organic amines or quaternary ammonium cations as templates, which include: $AlPO_4$-5, $AlPO_4$-8, $AlPO_4$-9, $AlPO_4$-11, $AlPO_4$-12, $AlPO_4$-14, $AlPO_4$-16, $AlPO_4$-17, $AlPO_4$-18, $AlPO_4$-20, $AlPO_4$-21, $AlPO_4$-22, $AlPO_4$-23, $AlPO_4$-25, $AlPO_4$-26, $AlPO_4$-28, $AlPO_4$-31, etc., and the templates used include tetramethylammonium hydroxide, tetraethylammonium hydroxide, tetrapropylammonium hydroxide, tetrabutylammonium hydroxide, tripropylamine, triethylamine, isopropylamine, butylamine, ethylenediamine, piperidine and its derivatives, cyclohexylamine, DABCO, quinuclidine, and the like.

U.S. Pat. No. 4,440,871 describes the synthesis of silicon-containing aluminophosphate molecular sieves including SAPO-5, SAPO-11, SAPO-16, SAPO-17, SAPO-20, SAPO-31, SAPO-34, SAPO-35, SAPO-37, SAPO-40, SAPO-41, SAPO-42, SAPO-44 and the like.

U.S. Pat. No. 4,752,651 describes the synthesis of a series of metal-containing silicoaluminophosphate molecular sieves including titanium-containing TiAPSO, magnesium-containing MgAPSO, manganese-containing MnAPSO, cobalt-containing CoAPSO, zinc-containing ZnAPSO and iron-containing FeAPSO, and the like.

For the synthesis of aluminophosphate molecular sieves, the organic template is a main factor determining the structure of the resulting molecular sieve, and a new molecular sieve is often obtained by using a new template. So far, organic amine and quaternary ammonium type organic compounds are templates most widely used in the synthesis of aluminophosphate molecular sieves.

SUMMARY OF THE INVENTION

It is an object of the present application to provide a novel silicoaluminophosphate molecular sieve, its preparation and application thereof, which has a unique X-ray diffraction pattern and can be used as an adsorbent, a catalyst or a catalyst carrier.

In an aspect, the present application provides a silicoaluminophosphate molecular sieve having a schematic chemical composition, expressed on a molar basis, of $mSiO_2 \cdot Al_2O_3 \cdot nP_2O_5$, wherein m represents the molar ratio of $SiO_2$ to $Al_2O_3$ and is in a range of about 0.005 to about 0.15, n represents the molar ratio of $P_2O_5$ to $Al_2O_3$ and is in a range of about 0.7 to about 1.1, wherein the molecular sieve has an X-ray diffraction pattern exhibiting a relative intensity profile as shown in the following table:

| 2 theta (°) | Interplanar spacing (Å) | Relative intensity ($I/I_0$) × 100 |
|---|---|---|
| 8.30-8.60 | 10.27-10.64 | VS |
| 13.67-14.00 | 6.32-6.44 | VS |
| 16.15-16.39 | 5.40-5.48 | W-M |
| 16.41-16.61 | 5.33-5.40 | W-M |
| 21.26-21.59 | 4.11-4.18 | M |
| 21.62-21.90 | 4.05-4.10 | M-S |
| 23.94-24.33 | 3.65-3.71 | W-M. |

In another aspect, the present application provides a method for preparing a silicoaluminophosphate molecular sieve, comprising the steps of:

i) providing a silicoaluminophosphate molecular sieve precursor, wherein the precursor has an X-ray diffraction pattern exhibiting a relative intensity profile as shown in the following table:

| 2 theta (°) | Interplanar spacing (Å) | Relative intensity ($I/I_0$) × 100 |
|---|---|---|
| 8.15-8.45 | 10.45-10.83 | S-VS |
| 13.36-13.67 | 6.47-6.62 | M-S |
| 15.77-16.07 | 5.51-5.61 | VS |
| 20.80-21.11 | 4.20-4.26 | VS |
| 21.49-21.79 | 4.07-4.13 | M |

| 2 theta (°) | Interplanar spacing (Å) | Relative intensity (I/I₀) × 100 |
|---|---|---|
| 22.16-22.46 | 3.95-4.01 | M-S |
| 23.42-23.72 | 3.75-3.79 | M | and ii) calcining the silicoaluminophosphate molecular sieve precursor to obtain the silicoaluminophosphate molecular sieve.

Preferably, the step i) further comprises:

ia) mixing a silicon source, an aluminum source, a phosphorus source, an organic material R and water at a molar ratio of the silicon source (calculated as $SiO_2$): the aluminum source (calculated as $Al_2O_3$):the phosphorus source (calculated as $P_2O_5$):R:$H_2O$ of about (0.01-0.3):1:(1.0-3.0):(3.0-6.0):(50-500) to obtain a synthetic mother liquor; and ib) subjecting the synthetic mother liquor to crystallization to obtain the molecular sieve precursor;

wherein the organic material R is an ammonium hydroxide having the following formula:

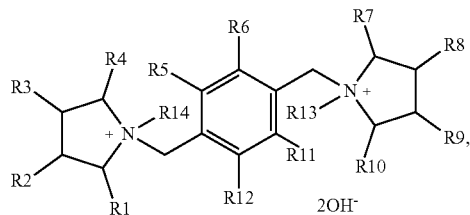

wherein the groups R1-R12, which may be identical or different from each other, are independently selected from H and $C_{1-6}$ alkyl groups, preferably from H and $C_{1-3}$ alkyl groups, more preferably H; and the groups R13 and R14, which may be identical or different from each other, are independently selected from $C_{1-6}$ alkyl groups, preferably $C_{1-3}$ alkyl groups, more preferably methyl.

In yet another aspect, the present application provides a silicoaluminophosphate molecular sieve obtained by the method disclosed herein.

In yet another aspect, the present application provides a molecular sieve composition comprising a silicoaluminophosphate molecular sieve according to the present application or a silicoaluminophosphate molecular sieve obtained by the method according to the present application, and a binder.

In a further aspect, the present application provides the use of a silicoaluminophosphate molecular sieve according to the present application, a silicoaluminophosphate molecular sieve obtained by the method according to the present application, or a molecular sieve composition according to the present application as an adsorbent, a catalyst, or a catalyst carrier.

The silicoaluminophosphate molecular sieve according to the present application has an open framework, so that the pore volume of the silicoaluminophosphate molecular sieve obtained by the method of the present application can reach about 0.09-0.25 ml/g, and its specific surface area can reach about 150-450 m²/g. Thus, the silicoaluminophosphate molecular sieve can be used as an adsorbent, such as an adsorbent for small organic molecules and water molecules.

In some specific reactions, such as the reaction for preparing light olefins from methanol, the molecular sieve can also be directly used as an active component of a catalyst.

Figure 1:
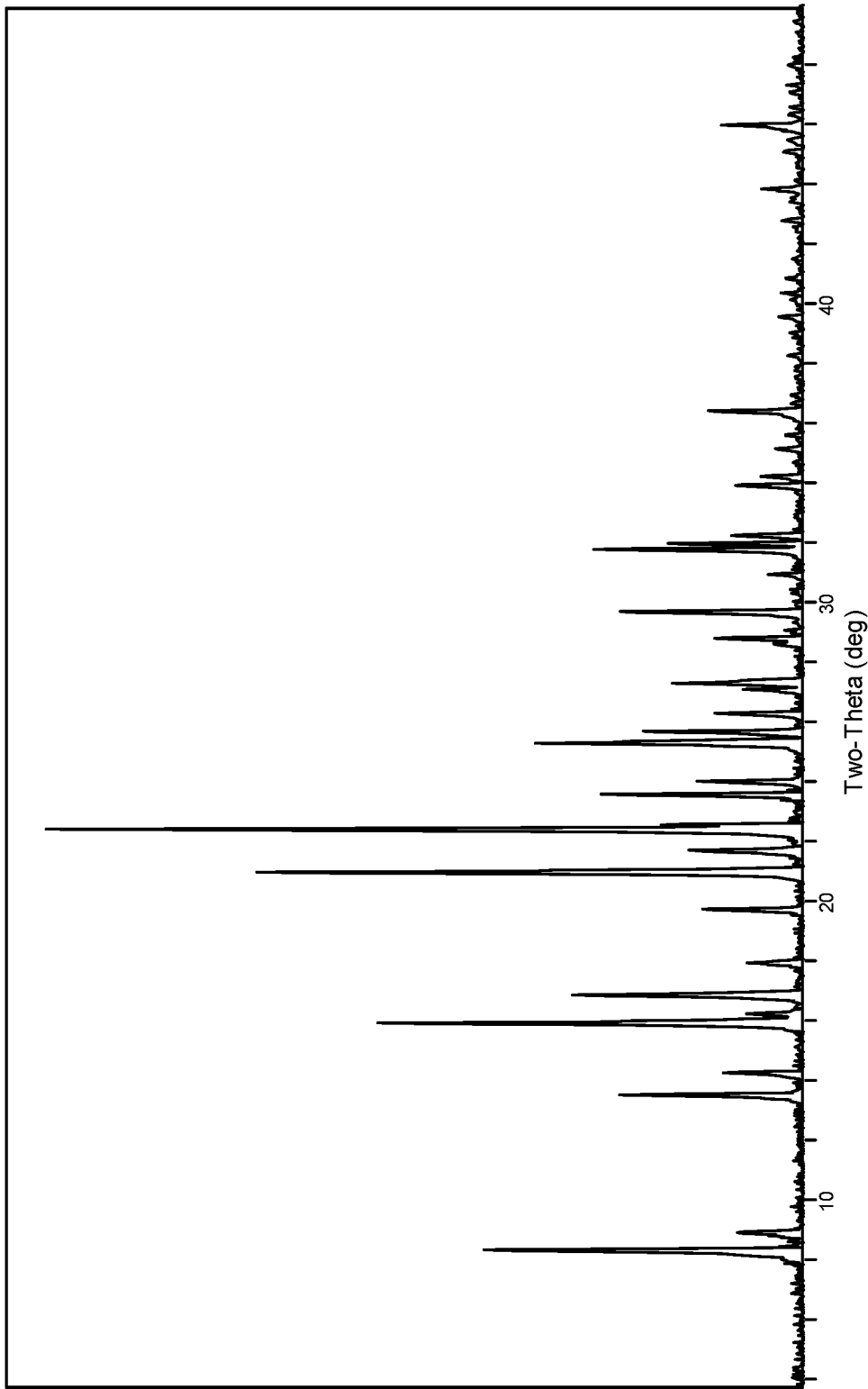
FIG. 1 shows an XRD pattern of a silicoaluminophosphate molecular sieve precursor obtained in Example 1.

The present application will be further illustrated with reference to the examples hereinbelow, which are not intended to be limiting.

DETAILED DESCRIPTION OF THE INVENTION

Embodiments of the present application will be described in detail hereinafter, but it should be noted that the scope of the present application is not intended to be limited by the embodiments, but is defined by the appended claims.

All publications, patent applications, patents, and other references mentioned herein are hereby incorporated by reference in their entireties. Unless defined otherwise, all technical and scientific terms used herein have the same meaning as commonly understood by one of ordinary skill in the art. In case of conflict, the definitions provided herein will control.

When materials, substances, methods, steps, devices, components, or the like are described herein as being "well-known to one of ordinary skill in the art", "prior art", or the like, they are intended to cover those commonly used in the art at the time of filing, and those that are not commonly used at the present time but will become known in the art as being useful for a similar purpose.

In the context of the present application, the term "molar ratio of $SiO_2$ to $Al_2O_3$" or "silica to alumina ratio" refers to the molar ratio of silicon, calculated as $SiO_2$, to aluminum, calculated as $Al_2O_3$.

In the context of the present application, the term "molar ratio of $P_2O_5$ to $Al_2O_3$" or "phosphorus pentoxide to alumina ratio" refers to the molar ratio of phosphorus, calculated as $P_2O_5$, to aluminum, calculated as $Al_2O_3$.

In the context of the present application, the term "specific surface area" refers to the total area of a sample per unit mass, including the internal and external surface areas. Non-porous samples, such as portland cement, some clay mineral particles, etc., have only an external surface area; porous samples, such as asbestos fibers, diatomaceous earth, molecular sieves, and the like, have both an external surface area and an internal surface area. The surface area of pores having a pore diameter of less than 2 nm in porous samples is referred to as the internal surface area, the surface area excluding the internal surface area is referred to as the external surface area, and the external surface area per unit mass of the sample is referred to as the external specific surface area.

In the context of the present application, the term "pore volume" refers to the volume of pores per unit mass of the molecular sieve. The term "total pore volume" refers to the volume of all pores (typically only including pores with a pore diameter of less than 50 nm) per mass of the molecular sieve. The term "micropore volume" refers to the volume of all micropores (typically including pores having a pore diameter of less than 2 nm) per unit mass of the molecular sieve.

In the context of the present application, the schematic chemical composition of the silicoaluminophosphate molecular sieve/molecular sieve precursor refers to the chemical composition of the framework of the molecular sieve/molecular sieve precursor, and the chemical composition only schematically shows the molar ratio of elements such as silicon (calculated as $SiO_2$), phosphorus (calculated as $P_2O_5$) and aluminum (calculated as $Al_2O_3$) in the framework of the molecular sieve/molecular sieve precursor, while the exact form of each element is not strictly limited, and can be generally determined by an inductively coupled plasma-atomic emission spectroscopy (ICP) method.

In the context of the present application, the structure of a molecular sieve is determined in accordance with the X-ray diffraction (XRD) pattern determined using an X-ray powder diffractometer, with a Cu-K$\alpha$ radiation source, K$\alpha$1 wavelength ($\lambda$=1.5405980 angstrom (Å)), K$\alpha$2 rays being removed using a monochromator.

In the context of the present application, in the XRD data of the molecular sieve, W, M, S, VS, W-M, M-S and S-VS, etc. represent the relative intensity $I/I_0$ of the corresponding diffraction peak with respect to the strongest diffraction peak (i.e., the diffraction peak with the largest area) calculated based on the diffraction peak areas, wherein I represents the peak area of the corresponding diffraction peak and $I_0$ represents the peak area of the strongest diffraction peak, W means weak, M means medium, S means strong, VS means very strong, W-M means from weak to medium, M-S means from medium to strong, and S-VS means from strong to very strong. Such expressions are well known to those skilled in the art. Generally, W represents less than 20; M represents 20-40; S represents 40-60; VS represents greater than 60, W-M represents less than 40, M-S represents 20-60, and S-VS represents greater than 40.

In the context of the present application, the terms "after calcination", "calcined form" or "calcined molecular sieve" refer to the state of the molecular sieve after calcination. The state after calcination may be, for example, a state of the molecular sieve in which the organic materials (particularly, organic templates) and water that may be present in the pores of the as-synthesized molecular sieve have been further removed by calcination.

It should be noted that two or more of the aspects (or embodiments) disclosed herein can be combined with one another in any combination, and the technical solution thus obtained (e.g., a method or system) is included as part of the original disclosure, and is within the scope of the present application.

Unless otherwise indicated, all percentages, parts, ratios, etc. mentioned in the present application are calculated on a molar basis, unless such a calculation is in conflict with conventional understanding of those skilled in the art.

In a first aspect, the present application provides a silicoaluminophosphate molecular sieve having a schematic chemical composition, expressed on a molar basis, of $mSiO_2 \cdot Al_2O_3 \cdot nP_2O_5$, wherein m represents the molar ratio of $SiO_2$ to $Al_2O_3$ and is in a range of about 0.005 to about 0.15, n represents the molar ratio of $P_2O_5$ to $Al_2O_3$ and is in a range of about 0.7 to about 1.1, wherein the molecular sieve has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.30-8.60 | 10.27-10.64 | VS |
| 13.67-14.00 | 6.32-6.44 | VS |
| 16.15-16.39 | 5.40-5.48 | W-M |
| 16.41-16.61 | 5.33-5.40 | W-M |
| 21.26-21.59 | 4.11-4.18 | M |
| 21.62-21.90 | 4.05-4.10 | M-S |
| 23.94-24.33 | 3.65-3.71 | W-M. |

In a preferred embodiment, the molecular sieve has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.30-8.60 | 10.27-10.64 | VS |
| 13.67-14.00 | 6.32-6.44 | VS |
| 16.15-16.39 | 5.40-5.48 | W-M |
| 16.41-16.61 | 5.33-5.40 | W-M |
| 21.26-21.59 | 4.11-4.18 | M |
| 21.62-21.90 | 4.05-4.10 | M-S |
| 23.94-24.33 | 3.65-3.71 | W-M |
| 24.35-24.66 | 3.60-3.65 | W-M |
| 25.61-25.97 | 3.43-3.48 | W-M |
| 27.71-28.13 | 3.17-3.22 | W-M |
| 29.35-29.67 | 3.01-3.04 | W-M. |

In a further preferred embodiment, the molecular sieve has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.30-8.60 | 10.27-10.64 | VS |
| 13.67-14.00 | 6.32-6.44 | VS |
| 13.94-14.15 | 6.25-6.34 | W-M |
| 16.15-16.39 | 5.40-5.48 | W-M |
| 16.41-16.61 | 5.33-5.40 | W-M |
| 17.13-17.43 | 5.08-5.17 | W |
| 19.62-19.92 | 4.45-4.52 | W |
| 21.26-21.59 | 4.11-4.18 | M |
| 21.62-21.90 | 4.05-4.10 | M-S |
| 22.10-22.40 | 3.96-4.02 | W |
| 23.94-24.33 | 3.65-3.71 | W-M |
| 24.35-24.66 | 3.60-3.65 | W-M |
| 25.61-25.97 | 3.43-3.48 | W-M |
| 27.71-28.13 | 3.17-3.22 | W-M |
| 28.14-28.44 | 3.13-3.17 | W |
| 29.35-29.67 | 3.01-3.04 | W-M. |

In some preferred embodiments, the molecular sieve has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.30-8.60 | 10.27-10.64 | 66-86 |
| 13.67-14.00 | 6.32-6.44 | 100 |
| 16.15-16.39 | 5.40-5.48 | 10-28 |
| 16.41-16.61 | 5.33-5.40 | 13-36 |
| 21.26-21.59 | 4.11-4.18 | 16-34 |
| 21.62-21.90 | 4.05-4.10 | 17-40 |
| 23.94-24.33 | 3.65-3.71 | 15-33. |

In a further preferred embodiment, the molecular sieve has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.30-8.60 | 10.27-10.64 | 66-86 |
| 13.67-14.00 | 6.32-6.44 | 100 |
| 16.15-16.39 | 5.40-5.48 | 10-28 |
| 16.41-16.61 | 5.33-5.40 | 13-36 |
| 21.26-21.59 | 4.11-4.18 | 16-34 |
| 21.62-21.90 | 4.05-4.10 | 17-40 |
| 23.94-24.33 | 3.65-3.71 | 15-33 |
| 24.35-24.66 | 3.60-3.65 | 10-27 |
| 25.61-25.97 | 3.43-3.48 | 10-30 |
| 27.71-28.13 | 3.17-3.22 | 12-36 |
| 29.35-29.67 | 3.01-3.04 | 19-44. |

In a still further preferred embodiment, the molecular sieve has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.30-8.60 | 10.27-10.64 | 66-86 |
| 13.67-14.00 | 6.32-6.44 | 100 |
| 13.94-14.15 | 6.25-6.34 | 5-15 |
| 16.15-16.39 | 5.40-5.48 | 10-28 |
| 16.41-16.61 | 5.33-5.40 | 13-36 |
| 17.13-17.43 | 5.08-5.17 | 1.5-12 |
| 19.62-19.92 | 4.45-4.52 | 3-18 |
| 21.26-21.59 | 4.11-4.18 | 16-34 |
| 21.62-21.90 | 4.05-4.10 | 17-40 |
| 22.10-22.40 | 3.96-4.02 | 2-10 |
| 23.94-24.33 | 3.65-3.71 | 15-33 |
| 24.35-24.66 | 3.60-3.65 | 10-27 |
| 25.61-25.97 | 3.43-3.48 | 10-30 |
| 27.71-28.13 | 3.17-3.22 | 12-36 |
| 28.14-28.44 | 3.13-3.17 | 3-16 |
| 29.35-29.67 | 3.01-3.04 | 19-44. |

In preferred embodiments, the silicoaluminophosphate molecular sieve has a silica to alumina ratio, i.e. m, in a range of from about 0.01 to about 0.10, and/or a phosphorus pentoxide to alumina ratio, i.e. n, in a range of from about 0.8 to about 1.0.

In a preferred embodiment, the silicoaluminophosphate molecular sieve has a pore volume of about 0.09 mL/g to about 0.25 mL/g, preferably about 0.15 mL/g to about 0.25 mL/g, and a specific surface area of about 150-450 m²/g, preferably about 200-400 m²/g.

In a second aspect, the present application provides a method for preparing a silicoaluminophosphate molecular sieve, comprising the steps of:
i) providing a silicoaluminophosphate molecular sieve precursor, wherein the precursor has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.15-8.45 | 10.45-10.83 | S-VS |
| 13.36-13.67 | 6.47-6.62 | M-S |
| 15.77-16.07 | 5.51-5.61 | VS |
| 20.80-21.11 | 4.20-4.26 | VS |
| 21.49-21.79 | 4.07-4.13 | M |

-continued

| 2 theta (°) | Interplanar spacing (Å) | Relative intensity $(I/I_0) \times 100$ |
|---|---|---|
| 22.16-22.46 | 3.95-4.01 | M-S |
| 23.42-23.72 | 3.75-3.79 | M, | and
ii) calcining the silicoaluminophosphate molecular sieve precursor to obtain the silicoaluminophosphate molecular sieve.

In a preferred embodiment, the silicoaluminophosphate molecular sieve precursor has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.15-8.45 | 10.45-10.83 | S-VS |
| 13.36-13.67 | 6.47-6.62 | M-S |
| 15.77-16.07 | 5.51-5.61 | VS |
| 16.66-16.96 | 5.22-5.31 | W-M |
| 19.51-19.81 | 4.48-4.54 | W-M |
| 20.80-21.11 | 4.20-4.26 | VS |
| 21.49-21.79 | 4.07-4.13 | M |
| 22.16-22.46 | 3.95-4.01 | M-S |
| 23.42-23.72 | 3.75-3.79 | M |
| 25.49-25.79 | 3.45-3.49 | W-M |
| 27.14-27.44 | 3.25-3.28 | W-M |
| 29.47-29.77 | 3.00-3.03 | W-M. |

In a further preferred embodiment, the silicoaluminophosphate molecular sieve precursor has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.15-8.45 | 10.45-10.83 | S-VS |
| 13.36-13.67 | 6.47-6.62 | M-S |
| 14.03-14.33 | 6.17-6.30 | W |
| 15.77-16.07 | 5.51-5.61 | VS |
| 16.66-16.96 | 5.22-5.31 | W-M |
| 17.11-17.41 | 5.09-5.18 | W |
| 19.51-19.81 | 4.48-4.54 | W-M |
| 20.80-21.11 | 4.20-4.26 | VS |
| 21.49-21.79 | 4.07-4.13 | M |
| 22.16-22.46 | 3.95-4.01 | M-S |
| 23.42-23.72 | 3.75-3.79 | M |
| 23.82-24.12 | 3.68-3.73 | W-M |
| 25.06-25.36 | 3.51-3.55 | W |
| 25.49-25.79 | 3.45-3.49 | W-M |
| 27.14-27.44 | 3.25-3.28 | W-M |
| 29.47-29.77 | 3.00-3.03 | W-M. |

In some preferred embodiments, the silicoaluminophosphate molecular sieve precursor has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.15-8.45 | 10.45-10.83 | 42-65 |
| 13.36-13.67 | 6.47-6.62 | 27-45 |
| 15.77-16.07 | 5.51-5.61 | 65-89 |
| 20.80-21.11 | 4.20-4.26 | 100 |
| 21.49-21.79 | 4.07-4.13 | 15-36 |

-continued

| 2 theta (°) | Interplanar spacing (Å) | Relative intensity $(I/I_0) \times 100$ |
|---|---|---|
| 22.16-22.46 | 3.95-4.01 | 25-55 |
| 23.42-23.72 | 3.75-3.79 | 25-38. |

In a further preferred embodiment, the silicoaluminophosphate molecular sieve precursor has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.15-8.45 | 10.45-10.83 | 42-65 |
| 13.36-13.67 | 6.47-6.62 | 27-45 |
| 15.77-16.07 | 5.51-5.61 | 65-89 |
| 16.66-16.96 | 5.22-5.31 | 10-25 |
| 19.51-19.81 | 4.48-4.54 | 10-25 |
| 20.80-21.11 | 4.20-4.26 | 100 |
| 21.49-21.79 | 4.07-4.13 | 15-36 |
| 22.16-22.46 | 3.95-4.01 | 25-55 |
| 23.42-23.72 | 3.75-3.79 | 25-38 |
| 25.49-25.79 | 3.45-3.49 | 12-32 |
| 27.14-27.44 | 3.25-3.28 | 10-30 |
| 29.47-29.77 | 3.00-3.03 | 22-36. |

In a still further preferred embodiment, the silicoaluminophosphate molecular sieve precursor has an X-ray diffraction pattern exhibiting a relative intensity profile as shown in the following table:

| 2 theta (°) | Interplanar spacing (Å) | Relative intensity $(I/I_0) \times 100$ |
|---|---|---|
| 8.15-8.45 | 10.45-10.83 | 42-65 |
| 13.36-13.67 | 6.47-6.62 | 27-45 |
| 14.03-14.33 | 6.17-6.30 | 5-16 |
| 15.77-16.07 | 5.51-5.61 | 65-89 |
| 16.66-16.96 | 5.22-5.31 | 10-25 |
| 17.11-17.41 | 5.09-5.18 | 4-16 |
| 19.51-19.81 | 4.48-4.54 | 10-25 |
| 20.80-21.11 | 4.20-4.26 | 100 |
| 21.49-21.79 | 4.07-4.13 | 15-36 |
| 22.16-22.46 | 3.95-4.01 | 25-55 |
| 23.42-23.72 | 3.75-3.79 | 25-38 |
| 23.82-24.12 | 3.68-3.73 | 12-30 |
| 25.06-25.36 | 3.51-3.55 | 5-15 |
| 25.49-25.79 | 3.45-3.49 | 12-32 |
| 27.14-27.44 | 3.25-3.28 | 10-30 |
| 29.47-29.77 | 3.00-3.03 | 22-36. |

In some preferred embodiments, the framework of the silicoaluminophosphate molecular sieve precursor has a schematic chemical composition, expressed on a molar basis, of $mSiO_2 \cdot Al_2O_3 \cdot nP_2O_5$, wherein m represents the molar ratio of $SiO_2$ to $Al_2O_3$ and is in a range of about 0.005 to about 0.15, and n represents the molar ratio of $P_2O_5$ to $Al_2O_3$ and is in a range of about 0.7 to about 1.1.

In a preferred embodiment, the step i) further comprises:
ia) mixing a silicon source, an aluminum source, a phosphorus source, an organic material R and water at a molar ratio of the silicon source (calculated as $SiO_2$):the aluminum source (calculated as $Al_2O_3$) the phosphorus source (calculated as $P_2O_5$) R:$H_2O$ of about (0.01-0.3):1:(1.0-3.0):(3.0-6.0):(50-500) to obtain a synthetic mother liquor; and
ib) subjecting the synthetic mother liquor to crystallization to obtain the molecular sieve precursor;

wherein the organic material R is an ammonium hydroxide having the following formula:

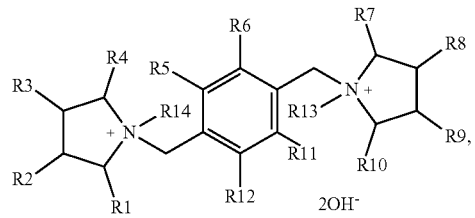

wherein the groups R1-R12, which may be identical or different from each other, are independently selected from H and $C_1$-6 alkyl groups, preferably from H and $C_1$-3 alkyl groups, more preferably H; and
the groups R13 and R14, which may be identical or different from each other, are independently selected from $C_1$-6 alkyl groups, preferably $C_1$-3 alkyl groups, more preferably methyl.

In the method according to the present application, the aluminum source is not particularly limited and may be, for example, those commonly used for producing aluminum-containing molecular sieves. In a preferred embodiment, the aluminum source is one or more selected from the group consisting of pseudo-boehmite, aluminum isopropoxide, aluminum sol, aluminum hydroxide, aluminum sulfate, aluminum chloride and aluminum oxide, preferably selected from the group consisting of pseudo-boehmite and aluminum isopropoxide.

In the method according to the present application, the phosphorus source is not particularly limited, and may be, for example, those commonly used for producing phosphorus-containing molecular sieves. In a preferred embodiment, the phosphorus source is one or more selected from the group consisting of phosphoric acid, orthophosphorous acid and phosphorus pentoxide, preferably phosphoric acid.

In the method according to the present application, the silicon source is not particularly limited, and may be, for example, those commonly used for producing silicon-containing molecular sieves. In a preferred embodiment, the silicon source is one or more selected from the group consisting of silica sol, silica white and tetraethyl orthosilicate, preferably tetraethyl orthosilicate.

In a preferred embodiment, in step ia) the silicon source, the aluminum source, the phosphorus source, the organic material R and water are mixed at a molar ratio of the silicon source (calculated as $SiO_2$):the aluminum source (calculated as $Al_2O_3$):the phosphorus source (calculated as $P_2O_5$):R: $H_2O$ of about (0.01-0.2):1:(1.0-2.0):(3.6-4.8):(100-300).

In a preferred embodiment, the organic material R is 1,1-[1,4-phenylenebis(methylene)]bis-1-methylpyrrolidinium dihydroxide, which may be represented by the formula:

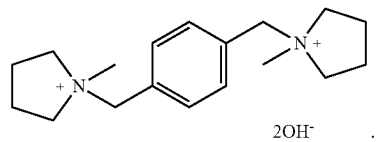

In a preferred embodiment, step ib) is carried out under the following conditions: a sealed reaction vessel, a crystallization temperature of about 140-200° C., and a crystallization time of about 48-160 hours. More preferably, the crystallization temperature is about 150-190° C. and the crystallization time is about 60-120 hours.

Further preferably, the step ib) further comprises washing and drying the resulting molecular sieve precursor. The washing and drying procedures are not particularly limited in the present application and may be performed in a conventional manner. For example, the washing may be performed with deionized water, and a method such as suction filtration or centrifugal separation can be adopted, until the spent washing solution is nearly neutral; and the drying may be, for example, drying in an oven at about 100-250° C. for about 1-48 hours.

In some preferred embodiments, in the molecular sieve precursor obtained in step ib), the molar ratio of phosphorus, calculated as $P_2O_5$, to aluminum, calculated as $Al_2O_3$, (i.e. $P_2O_5/Al_2O_3$), is in a range of about 0.7 to about 1.1, the molar ratio of silicon, calculated as $SiO_2$, to aluminum, calculated as $Al_2O_3$, (i.e. $SiO_2/Al_2O_3$), is in a range of about 0.005 to about 0.15, and the content of the organic material, based on the weight of the molecular sieve precursor, is in a range of about 10% to about 40%.

The silicoaluminophosphate molecular sieve precursor obtained in step ib) of the present application has a stable crystal structure, and can be calcined by conventional methods, which is not particularly limited in the present application. For example, the calcination may be performed at about 500-750° C. under an air atmosphere, and the calcination time may be, for example, about 1-10 hours. Particularly, the calcination may be performed at about 550° C. for about 6 hours under an air atmosphere. Depending on the calcination conditions, the resulting silicoaluminophosphate molecular sieve may contain a certain amount of residual carbonaceous material, but such residual carbonaceous material is not taken into account in the chemical composition of the molecular sieve.

In a preferred embodiment, the silicoaluminophosphate molecular sieve obtained in step ii) has an X-ray diffraction pattern exhibiting a relative intensity profile shown in the following table:

| 2 theta (°) | Interplanar spacing (Å) | Relative intensity $(I/I_0) \times 100$ |
|---|---|---|
| 8.30-8.60 | 10.27-10.64 | VS |
| 13.67-14.00 | 6.32-6.44 | VS |
| 16.15-16.39 | 5.40-5.48 | W-M |
| 16.41-16.61 | 5.33-5.40 | W-M |
| 21.26-21.59 | 4.11-4.18 | M |
| 21.62-21.90 | 4.05-4.10 | M-S |
| 23.94-24.33 | 3.65-3.71 | W-M. |

In a further preferred embodiment, the silicoaluminophosphate molecular sieve obtained in step ii) has an X-ray diffraction pattern exhibiting a relative intensity profile shown in the following table:

| 2 theta (°) | Interplanar spacing (Å) | Relative intensity $(I/I_0) \times 100$ |
|---|---|---|
| 8.30-8.60 | 10.27-10.64 | VS |
| 13.67-14.00 | 6.32-6.44 | VS |
| 16.15-16.39 | 5.40-5.48 | W-M |
| 16.41-16.61 | 5.33-5.40 | W-M |
| 21.26-21.59 | 4.11-4.18 | M |
| 21.62-21.90 | 4.05-4.10 | M-S |
| 23.94-24.33 | 3.65-3.71 | W-M |
| 24.35-24.66 | 3.60-3.65 | W-M |
| 25.61-25.97 | 3.43-3.48 | W-M |
| 27.71-28.13 | 3.17-3.22 | W-M |
| 29.35-29.67 | 3.01-3.04 | W-M. |

In a still further preferred embodiment, the silicoaluminophosphate molecular sieve obtained in step ii) exhibits a relative intensity profile as shown in the following table:

| 2 theta (°) | Interplanar spacing (Å) | Relative intensity $(I/I_0) \times 100$ |
|---|---|---|
| 8.30-8.60 | 10.27-10.64 | VS |
| 13.67-14.00 | 6.32-6.44 | VS |
| 13.94-14.15 | 6.25-6.34 | W-M |
| 16.15-16.39 | 5.40-5.48 | W-M |
| 16.41-16.61 | 5.33-5.40 | W-M |
| 17.13-17.43 | 5.08-5.17 | W |
| 19.62-19.92 | 4.45-4.52 | W |
| 21.26-21.59 | 4.11-4.18 | M |
| 21.62-21.90 | 4.05-4.10 | M-S |
| 22.10-22.40 | 3.96-4.02 | W |
| 23.94-24.33 | 3.65-3.71 | W-M |
| 24.35-24.66 | 3.60-3.65 | W-M |
| 25.61-25.97 | 3.43-3.48 | W-M |
| 27.71-28.13 | 3.17-3.22 | W-M |
| 28.14-28.44 | 3.13-3.17 | W |
| 29.35-29.67 | 3.01-3.04 | W-M. |

In some preferred embodiments, the silicoaluminophosphate molecular sieve obtained in step ii) has an X-ray diffraction pattern exhibiting a relative intensity profile shown in the following table:

| 2 theta (°) | Interplanar spacing (Å) | Relative intensity $(I/I_0) \times 100$ |
|---|---|---|
| 8.30-8.60 | 10.27-10.64 | 66-86 |
| 13.67-14.00 | 6.32-6.44 | 100 |
| 16.15-16.39 | 5.40-5.48 | 10-28 |
| 16.41-16.61 | 5.33-5.40 | 13-36 |
| 21.26-21.59 | 4.11-4.18 | 16-34 |
| 21.62-21.90 | 4.05-4.10 | 17-40 |
| 23.94-24.33 | 3.65-3.71 | 15-33. |

In a further preferred embodiment, the silicoaluminophosphate molecular sieve obtained in step ii) has an X-ray diffraction pattern exhibiting a relative intensity profile shown in the following table:

| 2 theta (°) | Interplanar spacing (Å) | Relative intensity $(I/I_0) \times 100$ |
|---|---|---|
| 8.30-8.60 | 10.27-10.64 | 66-86 |
| 13.67-14.00 | 6.32-6.44 | 100 |
| 16.15-16.39 | 5.40-5.48 | 10-28 |
| 16.41-16.61 | 5.33-5.40 | 13-36 |
| 21.26-21.59 | 4.11-4.18 | 16-34 |
| 21.62-21.90 | 4.05-4.10 | 17-40 |
| 23.94-24.33 | 3.65-3.71 | 15-33 |
| 24.35-24.66 | 3.60-3.65 | 10-27 |
| 25.61-25.97 | 3.43-3.48 | 10-30 |
| 27.71-28.13 | 3.17-3.22 | 12-36 |
| 29.35-29.67 | 3.01-3.04 | 19-44 |

In a still further preferred embodiment, the silicoaluminophosphate molecular sieve obtained in step ii) exhibits a relative intensity profile as shown in the following table:

| 2 theta (°) | Interplanar spacing (Å) | Relative intensity $(I/I_0) \times 100$ |
|---|---|---|
| 8.30-8.60 | 10.27-10.64 | 66-86 |
| 13.67-14.00 | 6.32-6.44 | 100 |
| 13.94-14.15 | 6.25-6.34 | 5-15 |
| 16.15-16.39 | 5.40-5.48 | 10-28 |
| 16.41-16.61 | 5.33-5.40 | 13-36 |
| 17.13-17.43 | 5.08-5.17 | 1.5-12 |
| 19.62-19.92 | 4.45-4.52 | 3-18 |
| 21.26-21.59 | 4.11-4.18 | 16-34 |
| 21.62-21.90 | 4.05-4.10 | 17-40 |
| 22.10-22.40 | 3.96-4.02 | 2-10 |
| 23.94-24.33 | 3.65-3.71 | 15-33 |
| 24.35-24.66 | 3.60-3.65 | 10-27 |
| 25.61-25.97 | 3.43-3.48 | 10-30 |
| 27.71-28.13 | 3.17-3.22 | 12-36 |
| 28.14-28.44 | 3.13-3.17 | 3-16 |
| 29.35-29.67 | 3.01-3.04 | 19-44. |

In the method according to the present application, under the combined effect of the silicon source, the aluminum source, the phosphorus source and the organic material R, the silicoaluminophosphate molecular sieve according to the present application with the specific X-ray diffraction pattern can be directionally prepared by controlling the feeding ratio of the starting materials.

In a third aspect, the present application provides a silicoaluminophosphate molecular sieve obtained by the method of the present application.

In a fourth aspect, the present application provides a molecular sieve composition comprising a silicoaluminophosphate molecular sieve according to the present application or a silicoaluminophosphate molecular sieve obtained by the method according to the present application, and a binder.

The molecular sieve composition may be in any physical form, such as powders, granules, or molded articles (e.g., bars, trilobes, etc.). These physical forms can be obtained in any manner commonly known in the art and are not particularly limited.

In the present application, the binder is not particularly limited, and for example, those commonly used for preparing adsorbents or catalysts, including but not limited to clay, carclazyte, silicon oxide, silica gel, alumina, zinc oxide or a mixture thereof, may be used.

In a fifth aspect, the present application provides the use of a silicoaluminophosphate molecular sieve according to the present application, a silicoaluminophosphate molecular sieve obtained by the method according to the present application, or a molecular sieve composition according to the present application as an adsorbent, a catalyst, or a catalyst carrier.

As examples of the adsorbent, those useful, for example, for removing water from an organic solvent, such as isopropyl alcohol, isobutyl alcohol and isobutyl ketone, containing a small amount of water, and for adsorbing and removing moisture from natural gas containing a small amount of moisture, may be mentioned As an example of the catalyst, a catalyst useful, for example, for producing light olefins, such as ethylene and propylene, from methanol may be mentioned.

In some preferred embodiments, the present application provides the following technical solutions:

Item 1, a silicoaluminophosphate molecular sieve having a chemical composition, excluding moisture, of $(Si_xAl_yP_z)O_2$, expressed in molar ratio, wherein $0<x\leq0.2$, $y\geq0.2$, $z\geq0.2$, and $x+y+z=1$, the molecular sieve has an X-ray diffraction pattern exhibiting a relative intensity profile as shown in the following table:

| Interplanar spacing (Å) | Relative intensity $(I/I_0) \times 100$ |
|---|---|
| d = 10.46 ± 0.17 | 56-88 |
| d = 6.40 ± 0.12 | 100 |
| d = 6.34 ± 0.11 | 20-45 |
| d = 5.46 ± 0.09 | 10-32 |
| d = 5.39 ± 0.09 | 10-38 |
| d = 5.14 ± 0.09 | 2-10 |
| d = 4.50 ± 0.06 | 2-15 |
| d = 4.15 ± 0.05 | 15-40 |
| d = 4.09 ± 0.05 | 20-50 |
| d = 4.00 ± 0.05 | 3-12 |
| d = 3.69 ± 0.05 | 18-35 |
| d = 3.64 ± 0.05 | 10-30 |
| d = 3.46 ± 0.05 | 18-35 |
| d = 3.19 ± 0.05 | 10-30 |
| d = 3.16 ± 0.05 | 3-20 |
| d = 3.03 ± 0.05 | 16-38 |
| d = 2.83 ± 0.05 | 5-20 |
| d = 2.75 ± 0.05 | 12-35 |
| d = 2.60 ± 0.05 | 2-15 |
| d = 2.57 ± 0.05 | 2-16. |

Item 2, the silicoaluminophosphate molecular sieve according to Item 1, characterized in that it has a chemical composition, excluding moisture, of $(Si_xAl_yP_z)O_2$, expressed in molar ratio, wherein $0<x\leq0.1$, $y\geq0.3$, $z\geq0.3$, and $x+y+z=1$.

Item 3, a method for preparing a silicoaluminophosphate molecular sieve according to Item 1, comprising the steps of:
a) uniformly mixing a silicon source, an aluminum source, a phosphorus source, an organic material R and water at a ratio of $(0.01-0.3)SiO_2:Al_2O_3:(1.0-3.0)P_2O_5:(3.0-6.0)R:(50-500)H_2O$ to obtain a synthetic mother liquor;
b) subjecting the synthetic mother liquor to crystallization in a sealed reaction vessel;
c) washing and drying the product obtained in the step b) to obtain the silicoaluminophosphate molecular sieve precursor; and
d) calcining the silicoaluminophosphate molecular sieve precursor to obtain the silicoaluminophosphate molecular sieve.

Item 4, the method for preparing a silicoaluminophosphate molecular sieve according to Item 3, characterized in that the silicon source, the aluminum source, the phosphorus source, the organic material R and water are uniformly mixed at a ratio of $(0.01-0.2)SiO_2:Al_2O_3:(1.0-2.0)P_2O_5:(3.6-4.8)R:(100-300)H_2O$ to obtain the synthetic mother liquor.

Item 5, the method for preparing a silicoaluminophosphate molecular sieve according to Item 3, wherein the organic material R is 1,1-[1,4-phenylenebis(methylene)]bis-1-methylpyrrolidinium dihydroxide.

Item 6, the method for preparing a silicoaluminophosphate molecular sieve according to Item 3, characterized in that the crystallization temperature is 140° C. to 200° C. and the crystallization time is 48 to 160 hours.

Item 7, the method for preparing a silicoaluminophosphate molecular sieve according to Item 3, wherein the aluminum source is at least one of pseudo-boehmite, aluminum isopropoxide, aluminum sol, aluminum hydroxide or aluminum oxide.

Item 8, the method for preparing a silicoaluminophosphate molecular sieve according to Item 3, wherein the phosphorus source is one or more selected from phosphoric acid, orthophosphorous acid or phosphorus pentoxide.

Item 9, the method for preparing a silicoaluminophosphate molecular sieve according to Item 3, wherein the silicon source is one of silica sol, silica white, or tetraethyl orthosilicate.

Item 10, the method for preparing a silicoaluminophosphate molecular sieve according to Item 3, wherein the silicoaluminophosphate molecular sieve precursor has an X-ray diffraction pattern as follows:

| Interplanar spacing (Å) | Relative intensity $(I/I_0) \times 100$ |
|---|---|
| d = 10.56 ± 0.16 | 45-70 |
| d = 9.88 ± 0.13 | 2-10 |
| d = 6.54 ± 0.11 | 30-50 |
| d = 6.21 ± 0.10 | 5-15 |
| d = 5.56 ± 0.09 | 65-86 |
| d = 5.46 ± 0.06 | 4-15 |
| d = 5.26 ± 0.06 | 13-33 |
| d = 4.95 ± 0.05 | 2-12 |
| d = 4.50 ± 0.05 | 6-18 |
| d = 4.23 ± 0.05 | 100 |
| d = 4.10 ± 0.05 | 8-20 |
| d = 3.97 ± 0.05 | 55-75 |
| d = 3.77 ± 0.05 | 25-40 |
| d = 3.71 ± 0.05 | 10-25 |
| d = 3.52 ± 0.05 | 16-32 |
| d = 3.47 ± 0.05 | 16-32 |
| d = 3.39 ± 0.05 | 5-15 |
| d = 3.27 ± 0.05 | 15-35 |
| d = 3.01 ± 0.05 | 15-35. |

EXAMPLES

The present application will be further illustrated with reference to the following examples, which are not intended to be limiting.

Starting Materials

In the following examples, the starting material 1,1-[1,4-phenylenebis(methylene)]bis-1-methylpyrrolidinium dihydroxide used is commercially available from SACHEM company, chemically pure with a mass concentration of 20.75% (aqueous solution); the pseudo-boehmite is commercially available from Shandong Ying Lang Chemicals Co., Ltd., chemical pure with a content of 72% by weight calculated as $Al_2O_3$; the phosphoric acid is commercially available from Sinopharm Chemical Reagent Co., Ltd., analytically pure with a mass concentration of 85% (aqueous solution); the aluminum isopropoxide is commercially available from Sinopharm Chemical Reagent Co., Ltd., chemically pure with a content of 24.7% by weight calculated as $Al_2O_3$.

Unless otherwise stated, chemical reagents used in the following examples are commercially available chemically pure products.

Analytical Instrument and Method

In the examples, the XRD pattern of the molecular sieve was determined using a PANalytical X'Pert PRO X-ray powder diffractometer, with a Cu-Kα radiation source, Kα1 wavelength (λ=1.5405980 angstrom (Å)), Kα2 rays being removed using a Ge (111) monochromator, operating current and voltage of 40 milliamps and 40 kilovolts, respectively, a scanning step size of 2 theta=0.02°, and a scanning rate of 6°/min.

The chemical composition of the molecular sieve was determined by inductively coupled plasma-atomic emission spectroscopy (ICP) using Model S-35 from Kontron, solid molecular sieve sample was dissolved with HF to make a solution before testing.

The specific surface area and pore volume of the molecular sieve were determined by the $N_2$ physical adsorption-desorption method using QUADRASORB evo Gas Sorption Surface Area and Pore Size Analyzer from Quantachrome, at a measuring temperature of 77K, and before the measurement, the sample was vacuum pretreated at 573K for 6 h. The specific surface area was calculated using the BET equation and the pore volume was calculated by the t-plot method.

The content of the organic material in the molecular sieve precursor was determined by the thermogravimetric analysis method using STA449F3 thermogravimetric analyzer from NETZSCH, with an air flow of 30 ml/min, and a heating rate of 10° C./min, wherein the weight loss percentage between 250° C. and 550° C. was taken as the content of the organic material.

Example 1

27.6 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.026 g of tetraethyl orthosilicate were added thereto while stirring, 2.30 g of 85% phosphoric acid solution was then slowly added dropwise, and stirred uniformly to obtain a synthetic mother liquor having the following composition expressed in molar ratio (wherein $SiO_2$ represents the silicon source calculated as $SiO_2$, $Al_2O_3$ represents the aluminum source calculated as $Al_2O_3$, $P_2O_5$ represents the phosphorus source calculated as $P_2O_5$, the same below):

$0.03SiO_2:1.0Al_2O_3:2.4P_2O_5:4.8R:190H_2O$

Figure 2:
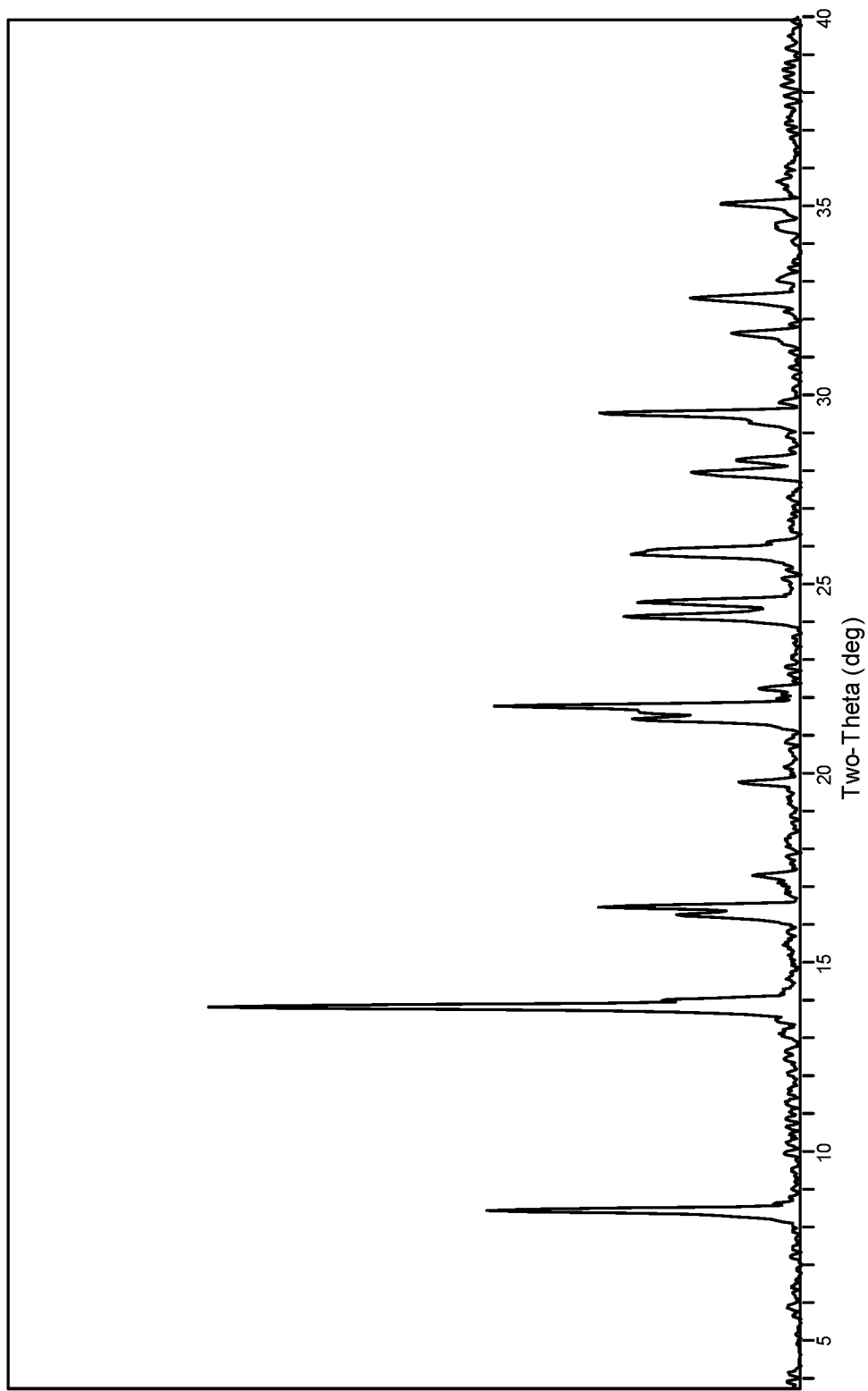
FIG. 2 shows an XRD pattern of a silicoaluminophosphate molecular sieve obtained in Example 1.

The synthetic mother liquor was crystallized in a sealed reaction vessel at a crystallization temperature of 190° C. for 60 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.98, a molar ratio of silicon, calculated as $SiO_2$, to aluminum, calculated as $Al_2O_3$, (i.e. $SiO_2/Al_2O_3$), of 0.026, a content by weight of the organic material of 18.9%, the XRD pattern shown in FIG. 1 and the XRD data shown in Table 1A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3=0.026$ and a phosphorus pentoxide to alumina ratio $P_2O_5/Al_2O_3=0.98$ (i.e. a schematic chemical composition of 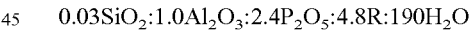) as determined by inductively coupled plasma-atomic emission spectroscopy (ICP), a specific surface area of 240 m²/g, a micropore volume of 0.19 ml/g, the XRD pattern as shown in FIG. 2, and the corresponding XRD data as shown in Table 1B.

TABLE 1A

XRD data of the silicoaluminophosphate molecular sieve precursor obtained in Example 1

| 2 theta (°) | Interplanar spacing (Å) | Relative intensity $(I/I_0) \times 100$ |
|---|---|---|
| 8.24 | 10.71 | 51.8 |
| 13.44 | 6.58 | 28.8 |
| 14.14 | 6.26 | 5.9 |
| 15.84 | 5.59 | 71.0 |
| 16.74 | 5.29 | 15.8 |
| 17.26 | 5.13 | 3.4 |
| 19.62 | 4.52 | 14.2 |
| 20.90 | 4.25 | 100 |
| 21.59 | 4.11 | 20.2 |
| 22.29 | 3.98 | 46.8 |
| 23.50 | 3.78 | 37.0 |
| 23.91 | 3.72 | 16.7 |
| 25.16 | 3.54 | 14.2 |
| 25.57 | 3.48 | 20.5 |
| 27.23 | 3.27 | 21.0 |
| 29.57 | 3.02 | 20.1 |

TABLE 1B

XRD data of the silicoaluminophosphate molecular sieve obtained in Example 1

| 2 theta (°) | Interplanar spacing (Å) | Relative intensity $(I/I_0) \times 100$ |
|---|---|---|
| 8.56 | 10.32 | 87.9 |
| 13.97 | 6.33 | 100 |
| 14.12 | 6.26 | 27.5 |
| 16.39 | 5.40 | 19.5 |
| 16.60 | 5.33 | 30.8 |
| 17.40 | 5.09 | 5.9 |
| 19.89 | 4.46 | 9.4 |
| 21.57 | 4.12 | 28.2 |
| 21.90 | 4.05 | 56.2 |
| 22.37 | 3.97 | 6.1 |
| 24.28 | 3.66 | 23 |
| 24.66 | 3.60 | 33.1 |
| 25.92 | 3.44 | 23.7 |
| 28.10 | 3.17 | 18.6 |
| 28.42 | 3.14 | 10.2 |
| 29.65 | 3.01 | 30.8 |

Example 2

27.6 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.026 g of tetraethyl orthosilicate were added thereto while stirring, then 2.30 g of 85% phosphoric acid solution was slowly added dropwise, and stirred uniformly to obtain a synthetic mother liquor having the following composition expressed in molar ratio:

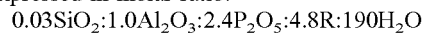
$0.03SiO_2:1.0Al_2O_3:2.4P_2O_5:4.8R:190H_2O$

The synthetic mother liquor was crystallized in a sealed reaction vessel at a crystallization temperature of 170° C. for 60 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.97, a molar ratio of silicon, calculated as $SiO_2$, to aluminum, calculated as $Al_2O_3$, (i.e. $SiO_2/Al_2O_3$), of 0.028, a content by weight of the organic material of 21.4%, and the XRD data as shown in Table 2A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3=0.028$ and a phosphorus pentoxide to alumina ratio $P_2O_5/Al_2O_3=0.97$ (i.e. a schematic chemical composition of $0.028\ SiO_2 \cdot Al_2O_3 \cdot 0.97\ P_2O_5$) as determined by inductively coupled plasma-atomic emission spectroscopy (ICP), a specific surface area of 347 m$^2$/g, a micropore volume of 0.23 ml/g, and the corresponding XRD data as shown in Table 2B.

TABLE 2A

XRD data of the silicoaluminophosphate molecular sieve precursor obtained in Example 2

| 2 theta (°) | Interplanar spacing (Å) | Relative intensity $(I/I_0) \times 100$ |
|---|---|---|
| 8.33 | 10.61 | 49.1 |
| 13.52 | 6.54 | 34.7 |
| 14.26 | 6.21 | 9.5 |
| 15.92 | 5.56 | 76.1 |
| 16.85 | 5.26 | 26.9 |
| 19.73 | 4.50 | 12.6 |
| 20.97 | 4.23 | 100 |
| 21.70 | 4.09 | 20.5 |
| 22.41 | 3.96 | 73.2 |
| 23.58 | 3.77 | 32.0 |
| 24.01 | 3.70 | 15.3 |
| 25.28 | 3.52 | 19.9 |
| 25.68 | 3.47 | 21.4 |
| 27.30 | 3.26 | 20.5 |
| 29.69 | 3.00 | 22.8 |

TABLE 2B

XRD data of the silicoaluminophosphate molecular sieve obtained in Example 2

| 2 theta (°) | Interplanar spacing (Å) | Relative intensity $(I/I_0) \times 100$ |
|---|---|---|
| 8.47 | 10.43 | 94.1 |
| 13.86 | 6.38 | 100 |
| 14.00 | 6.32 | 21.4 |
| 16.30 | 5.43 | 21.4 |
| 16.47 | 5.38 | 18.9 |
| 17.28 | 5.13 | 4.1 |
| 19.77 | 4.49 | 5.4 |
| 21.47 | 4.13 | 30.3 |
| 21.75 | 4.08 | 30.3 |
| 22.24 | 3.99 | 5.1 |
| 24.18 | 3.68 | 27.8 |
| 24.52 | 3.63 | 16.5 |
| 25.82 | 3.45 | 19.5 |
| 27.99 | 3.18 | 17.5 |
| 28.29 | 3.15 | 6.7 |
| 29.52 | 3.02 | 23.3 |

Example 3

27.6 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.026 g of tetraethyl orthosilicate were added thereto while stirring, then 2.30 g of 85% phosphoric acid solution was slowly added dropwise, and stirred uniformly to obtain a synthetic mother liquor having the following composition expressed in molar ratio:

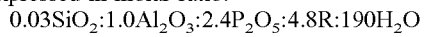
$0.03SiO_2:1.0Al_2O_3:2.4P_2O_5:4.8R:190H_2O$

The synthetic mother liquor was crystallized in a sealed reaction vessel at a crystallization temperature of 150° C. for 60 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.98, a molar ratio of silicon, calculated as $SiO_2$, to aluminum, calculated as $Al_2O_3$, (i.e. $SiO_2/Al_2O_3$), of 0.029, a content by weight of the organic material of 30.0%, and the XRD data as shown in Table 3A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3$=0.029 and a phosphorus pentoxide to alumina ratio $P_2O_5/Al_2O_3$=0.98 (i.e. a schematic chemical composition of 0.029 $SiO_2 \cdot Al_2O_3 \cdot 0.98$ $P_2O_5$) as determined by inductively coupled plasma-atomic emission spectroscopy (ICP), a specific surface area of 229 $m^2/g$, a micropore volume of 0.20 ml/g, and the XRD data as shown in Table 3B.

TABLE 3A

XRD data of the silicoaluminophosphate molecular sieve precursor obtained in Example 3

| 2 theta (°) | Interplanar spacing (Å) | Relative intensity $(I/I_0) \times 100$ |
|---|---|---|
| 8.30 | 10.64 | 55.5 |
| 13.51 | 6.55 | 39.5 |
| 14.18 | 6.24 | 7.5 |
| 15.92 | 5.56 | 80.3 |
| 16.79 | 5.28 | 17.5 |
| 17.26 | 5.13 | 8.3 |
| 19.66 | 4.51 | 15.9 |
| 20.96 | 4.23 | 100 |
| 21.64 | 4.10 | 29.4 |
| 22.31 | 3.98 | 42.7 |
| 23.58 | 3.77 | 33.0 |
| 23.97 | 3.71 | 20.0 |
| 25.19 | 3.53 | 12.1 |
| 25.62 | 3.47 | 19.7 |
| 27.28 | 3.26 | 19.4 |
| 29.62 | 3.01 | 20.8 |

TABLE 3B

XRD data of the silicoaluminophosphate molecular sieve obtained in Example 3

| 2 theta (°) | Interplanar spacing (Å) | Relative intensity $(I/I_0) \times 100$ |
|---|---|---|
| 8.50 | 10.39 | 80.8 |
| 13.89 | 6.37 | 100 |
| 14.06 | 6.29 | 14.0 |
| 16.35 | 5.42 | 18.1 |
| 16.50 | 5.37 | 18.0 |
| 17.28 | 5.13 | 3.3 |
| 19.81 | 4.48 | 7.2 |
| 21.48 | 4.13 | 38.4 |
| 21.80 | 4.07 | 26.5 |
| 22.30 | 3.98 | 7.1 |
| 24.21 | 3.67 | 24.2 |
| 24.54 | 3.62 | 14.5 |
| 25.85 | 3.44 | 20.3 |
| 28.02 | 3.18 | 15.8 |
| 28.32 | 3.15 | 6.9 |
| 29.53 | 3.02 | 20.6 |

Example 4

27.6 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.026 g of tetraethyl orthosilicate were added thereto while stirring, then 2.30 g of 85% phosphoric acid solution was slowly added dropwise, and stirred uniformly to obtain a synthetic mother liquor having the following composition expressed in molar ratio:

$0.03SiO_2:1.0Al_2O_3:2.4P_2O_5:4.8R:190H_2O$

The synthetic mother liquor was crystallized in a sealed reaction vessel at a crystallization temperature of 200° C. for 48 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.97, a molar ratio of silicon, calculated as $SiO_2$, to aluminum, calculated as $Al_2O_3$, (i.e. $SiO_2/Al_2O_3$), of 0.031, a content by weight of the organic material of 21.5%, and the XRD data as shown in Table 4A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3$=0.031 and a phosphorus pentoxide to alumina ratio $P_2O_5/Al_2O_3$=0.97 (i.e. a schematic chemical composition of 0.031 $SiO_2 \cdot Al_2O_3 \cdot 0.97$ $P_2O_5$) as determined by inductively coupled plasma-atomic emission spectroscopy (ICP), a specific surface area of 350 $m^2/g$, a micropore volume of 0.24 ml/g, and the XRD data as shown in Table 4B.

TABLE 4A

XRD data of the silicoaluminophosphate molecular sieve precursor obtained in Example 4

| 2 theta (°) | Interplanar spacing (Å) | Relative intensity $(I/I_0) \times 100$ |
|---|---|---|
| 8.29 | 10.65 | 62.0 |
| 13.49 | 6.56 | 39.2 |
| 14.22 | 6.22 | 10.0 |
| 15.89 | 5.57 | 84.1 |
| 16.82 | 5.27 | 24.2 |
| 17.41 | 5.09 | 4.9 |
| 19.69 | 4.51 | 14.1 |
| 20.93 | 4.24 | 100 |
| 21.66 | 4.10 | 14.7 |
| 22.37 | 3.97 | 66.5 |
| 23.54 | 3.78 | 33.1 |
| 23.97 | 3.71 | 15.7 |
| 25.24 | 3.52 | 19.9 |
| 25.62 | 3.47 | 22.6 |
| 27.25 | 3.27 | 19.1 |
| 29.64 | 3.01 | 23.0 |

TABLE 4B

XRD data of the silicoaluminophosphate molecular sieve obtained in Example 4

| 2 theta (°) | Interplanar spacing (Å) | Relative intensity $(I/I_0) \times 100$ |
|---|---|---|
| 8.43 | 10.48 | 72.8 |
| 13.81 | 6.40 | 100 |
| 13.94 | 6.34 | 33.1 |
| 16.23 | 5.46 | 19.1 |
| 16.42 | 5.39 | 24.8 |
| 17.19 | 5.15 | 2.5 |
| 19.71 | 4.50 | 8.8 |
| 21.41 | 4.15 | 28.8 |
| 21.70 | 4.09 | 36.7 |
| 24.11 | 3.69 | 30.8 |
| 24.42 | 3.64 | 16.2 |
| 25.82 | 3.45 | 23.7 |

TABLE 4B-continued

XRD data of the silicoaluminophosphate
molecular sieve obtained in Example 4

| 2 theta (°) | Interplanar spacing (Å) | Relative intensity ($I/I_0$) × 100 |
|---|---|---|
| 27.87 | 3.20 | 16.7 |
| 28.17 | 3.16 | 9.0 |
| 29.45 | 3.03 | 25.3 |

Example 5

27.6 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.017 g of tetraethyl orthosilicate were added thereto while stirring, then 2.30 g of 85% phosphoric acid solution was slowly added dropwise, and stirred uniformly to obtain a synthetic mother liquor having the following composition expressed in molar ratio:

$0.02SiO_2:1.0Al_2O_3:2.4P_2O_5:4.8R:190H_2O$

The synthetic mother liquor was crystallized in a sealed reaction vessel at a crystallization temperature of 190° C. for 60 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.99, a molar ratio of silicon, calculated as $SiO_2$, to aluminum, calculated as $Al_2O_3$, (i.e. $SiO_2/Al_2O_3$), of 0.021, a content by weight of the organic material of 18.7%, and the XRD data as shown in Table 5A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3$=0.021 and a phosphorus pentoxide to alumina ratio $P_2O_5/Al_2O_3$=0.99 (i.e. a schematic chemical composition of 0.021 $SiO_2 \cdot Al_2O_3 \cdot 0.99$ $P_2O_5$) as determined by inductively coupled plasma-atomic emission spectroscopy (ICP), a specific surface area of 290 m$^2$/g, a micropore volume of 0.18 ml/g, and the XRD data as shown in Table 5B.

TABLE 5A

XRD data of the silicoaluminophosphate molecular
sieve precursor obtained in Example 5

| 2 theta (°) | Interplanar spacing (Å) | Relative intensity ($I/I_0$) × 100 |
|---|---|---|
| 8.22 | 10.74 | 58.0 |
| 13.42 | 6.59 | 31.1 |
| 14.13 | 6.26 | 6.6 |
| 15.82 | 5.60 | 68.5 |
| 16.72 | 5.30 | 20.9 |
| 17.26 | 5.13 | 7.5 |
| 19.60 | 4.53 | 15.0 |
| 20.87 | 4.25 | 100 |
| 21.57 | 4.12 | 20.2 |
| 22.26 | 3.99 | 55.9 |
| 23.48 | 3.79 | 36.5 |
| 23.90 | 3.72 | 20.3 |
| 25.14 | 3.54 | 19.8 |
| 25.56 | 3.48 | 22.4 |
| 27.21 | 3.28 | 26.7 |
| 29.55 | 3.02 | 23.8 |

TABLE 5B

XRD data of the silicoaluminophosphate
molecular sieve obtained in Example 5

| 2 theta (°) | Interplanar spacing (Å) | Relative intensity ($I/I_0$) × 100 |
|---|---|---|
| 8.45 | 10.45 | 100 |
| 13.77 | 6.43 | 80.3 |
| 14.00 | 6.32 | 21.6 |
| 16.17 | 5.48 | 16.7 |
| 16.47 | 5.38 | 24.8 |
| 17.31 | 5.11 | 5.9 |
| 19.68 | 4.51 | 5.3 |
| 21.29 | 4.17 | 25.2 |
| 21.75 | 4.08 | 39.6 |
| 22.17 | 4.01 | 3.9 |
| 23.96 | 3.71 | 13.4 |
| 24.50 | 3.63 | 21.9 |
| 25.64 | 3.47 | 10.7 |
| 27.72 | 3.22 | 9.0 |
| 28.21 | 3.16 | 5.8 |
| 29.38 | 3.04 | 14.7 |

Example 6

27.6 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.009 g of tetraethyl orthosilicate was added thereto while stirring, then 2.30 g of 85% phosphoric acid solution was slowly added dropwise, and stirred uniformly to obtain a synthetic mother liquor having the following composition expressed in molar ratio:

$0.01SiO_2:1.0Al_2O_3:2.4P_2O_5:4.8R:190H_2O$

The synthetic mother liquor was crystallized in a sealed reaction vessel at a crystallization temperature of 190° C. for 60 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.98, a molar ratio of silicon, calculated as $SiO_2$, to aluminum, calculated as $Al_2O_3$, (i.e. $SiO_2/Al_2O_3$), of 0.012, a content by weight of the organic material of 25.9%, and the XRD data as shown in Table 6A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3$=0.012 and a phosphorus pentoxide to alumina ratio $P_2O_5/Al_2O_3$=0.98 (i.e. a schematic chemical composition of 0.012 $SiO_2 \cdot Al_2O_3 \cdot 0.98$ $P_2O_5$) as determined by inductively coupled plasma-atomic emission spectroscopy (ICP), a specific surface area of 249 m$^2$/g, a micropore volume of 0.20 ml/g, and the XRD data as shown in Table 6B.

TABLE 6A

XRD data of the silicoaluminophosphate molecular
sieve precursor obtained in Example 6

| 2 theta (°) | Interplanar spacing (Å) | Relative intensity ($I/I_0$) × 100 |
|---|---|---|
| 8.15 | 10.83 | 67.3 |
| 13.36 | 6.62 | 28.3 |
| 14.03 | 6.30 | 4.3 |
| 15.77 | 5.61 | 73.1 |
| 16.66 | 5.31 | 14.2 |
| 17.18 | 5.16 | 6.0 |
| 19.52 | 4.54 | 14.1 |

TABLE 6A-continued

XRD data of the silicoaluminophosphate molecular sieve precursor obtained in Example 6

| 2 theta (°) | Interplanar spacing (Å) | Relative intensity $(I/I_0) \times 100$ |
|---|---|---|
| 20.80 | 4.26 | 100 |
| 21.50 | 4.13 | 20.2 |
| 22.19 | 4.00 | 39.7 |
| 23.40 | 3.79 | 39.1 |
| 23.82 | 3.73 | 19.3 |
| 25.06 | 3.55 | 13.6 |
| 25.49 | 3.49 | 22.7 |
| 27.14 | 3.28 | 26.3 |
| 29.47 | 3.03 | 20.6 |

TABLE 6B

XRD data of the silicoaluminophosphate molecular sieve obtained in Example 6

| 2 theta (°) | Interplanar spacing (Å) | Relative intensity $(I/I_0) \times 100$ |
|---|---|---|
| 8.50 | 10.40 | 100 |
| 13.81 | 6.41 | 99.1 |
| 14.04 | 6.30 | 26.1 |
| 16.21 | 5.46 | 22.9 |
| 16.52 | 5.36 | 25.6 |
| 17.35 | 5.11 | 6.4 |
| 19.73 | 4.50 | 6.5 |
| 21.33 | 4.16 | 32 |
| 21.80 | 4.07 | 38.6 |
| 22.21 | 4.00 | 4.1 |
| 24.00 | 3.70 | 18.5 |
| 24.54 | 3.62 | 21.5 |
| 25.68 | 3.47 | 11.6 |
| 27.75 | 3.21 | 12.4 |
| 28.25 | 3.16 | 6.9 |
| 29.42 | 3.03 | 16.9 |

Example 7

27.6 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.043 g of tetraethyl orthosilicate were added thereto while stirring, then 2.30 g of 85% phosphoric acid solution was slowly added dropwise, and stirred uniformly to obtain a synthetic mother liquor having the following composition expressed in molar ratio:

$0.05SiO_2:1.0Al_2O_3:2.4P_2O_5:4.8R:190H_2O$

The synthetic mother liquor was crystallized in a sealed reaction vessel at a crystallization temperature of 190° C. for 60 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.97, a molar ratio of silicon, calculated as $SiO_2$, to aluminum, calculated as $Al_2O_3$, (i.e. $SiO_2/Al_2O_3$), of 0.047, a content by weight of the organic material of 33.4%, and the XRD data as shown in Table 7A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3$=0.047 and a phosphorus pentoxide to alumina ratio $P_2O_5/Al_2O_3$=0.97 (i.e. a schematic chemical composition of 0.047 $SiO_2 \cdot Al_2O_3 \cdot 0.97$ $P_2O_5$) as determined by inductively coupled plasma-atomic emission spectroscopy (ICP), a specific surface area of 270 m²/g, a micropore volume of 0.21 ml/g, and the XRD data as shown in Table 7B.

TABLE 7A

XRD data of the silicoaluminophosphate molecular sieve precursor obtained in Example 7

| 2 theta (°) | Interplanar spacing (Å) | Relative intensity $(I/I_0) \times 100$ |
|---|---|---|
| 8.24 | 10.72 | 43.5 |
| 13.43 | 6.58 | 25.5 |
| 14.14 | 6.26 | 5.4 |
| 15.84 | 5.59 | 65.2 |
| 16.74 | 5.29 | 17.5 |
| 19.62 | 4.52 | 13.2 |
| 20.88 | 4.25 | 100 |
| 21.59 | 4.11 | 15.5 |
| 22.29 | 3.99 | 54.5 |
| 23.49 | 3.78 | 37.6 |
| 23.92 | 3.72 | 18.4 |
| 25.16 | 3.54 | 18.6 |
| 25.56 | 3.48 | 22.8 |
| 27.21 | 3.27 | 23.6 |
| 29.57 | 3.02 | 24.1 |

TABLE 7B

XRD data of the silicoaluminophosphate molecular sieve obtained in Example 7

| 2 theta (°) | Interplanar spacing (Å) | Relative intensity $(I/I_0) \times 100$ |
|---|---|---|
| 8.45 | 10.45 | 100 |
| 13.77 | 6.43 | 90.0 |
| 14.00 | 6.32 | 23.2 |
| 16.17 | 5.48 | 19.7 |
| 16.46 | 5.38 | 23.2 |
| 17.30 | 5.12 | 5.3 |
| 19.66 | 4.51 | 5.9 |
| 21.27 | 4.17 | 29.2 |
| 21.74 | 4.08 | 35.5 |
| 22.19 | 4.00 | 3.9 |
| 23.94 | 3.71 | 16.1 |
| 24.50 | 3.63 | 21.3 |
| 25.64 | 3.47 | 10.2 |
| 27.71 | 3.22 | 11.5 |
| 28.21 | 3.16 | 6.0 |
| 29.36 | 3.04 | 14.5 |

Example 8

27.6 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.069 g of tetraethyl orthosilicate were added thereto while stirring, 2.30 g of 85% phosphoric acid solution was then slowly added dropwise, and stirred uniformly to obtain a synthetic mother liquor having the following composition expressed in molar ratio:

$0.08SiO_2:1.0Al_2O_3:2.4P_2O_5:4.8R:190H_2O$

The synthetic mother liquor was crystallized in a sealed reaction vessel at a crystallization temperature of 190° C. for 60 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.96, a molar ratio of silicon, calculated as $SiO_2$, to aluminum, calculated as $Al_2O_3$, (i.e. $SiO_2/Al_2O_3$), of 0.078, a content by weight of the organic material of 15.2%, and the XRD data as shown in Table 8A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3=0.078$ and a phosphorus pentoxide to alumina ratio $P_2O_5/Al_2O_3=0.96$ (i.e. a schematic chemical composition of 0.078 $SiO_2 \cdot Al_2O_3 \cdot 0.96$ $P_2O_5$) as determined by inductively coupled plasma-atomic emission spectroscopy (ICP), a specific surface area of 302 m$^2$/g, a micropore volume of 0.20 ml/g, and the XRD data as shown in Table 8B.

TABLE 8A

XRD data of the silicoaluminophosphate molecular sieve precursor obtained in Example 8

| 2 theta (°) | Interplanar spacing (Å) | Relative intensity ($I/I_0$) × 100 |
|---|---|---|
| 8.19 | 10.79 | 55.0 |
| 13.39 | 6.60 | 33.3 |
| 14.08 | 6.28 | 6.2 |
| 15.78 | 5.61 | 73.5 |
| 16.68 | 5.31 | 20.8 |
| 17.21 | 5.15 | 4.9 |
| 19.56 | 4.54 | 16.0 |
| 20.84 | 4.26 | 100 |
| 21.53 | 4.12 | 17.1 |
| 22.23 | 4.00 | 53.5 |
| 23.44 | 3.79 | 35.1 |
| 23.86 | 3.73 | 19.9 |
| 25.10 | 3.54 | 19.0 |
| 25.51 | 3.49 | 23.7 |
| 27.17 | 3.28 | 23.1 |
| 29.51 | 3.02 | 22.1 |

TABLE 8B

XRD data of the silicoaluminophosphate molecular sieve obtained in Example 8

| 2 theta (°) | Interplanar spacing (Å) | Relative intensity ($I/I_0$) × 100 |
|---|---|---|
| 8.45 | 10.46 | 100 |
| 13.77 | 6.43 | 91.2 |
| 13.99 | 6.32 | 26.1 |
| 16.15 | 5.48 | 19.9 |
| 16.45 | 5.38 | 30.7 |
| 17.30 | 5.12 | 6.7 |
| 19.66 | 4.51 | 6.6 |
| 21.28 | 4.17 | 28 |
| 21.73 | 4.08 | 45.9 |
| 22.17 | 4.01 | 4.7 |
| 23.94 | 3.71 | 15.5 |
| 24.49 | 3.63 | 25.6 |
| 25.63 | 3.47 | 12.2 |
| 27.71 | 3.22 | 10.3 |
| 28.21 | 3.16 | 6.8 |
| 29.36 | 3.04 | 16.2 |

Example 9

27.6 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.087 g of tetraethyl orthosilicate were added thereto while stirring, 2.30 g of 85% phosphoric acid solution was then slowly added dropwise, and stirred uniformly to obtain a synthetic mother liquor having the following composition expressed in molar ratio:
0.1SiO$_2$:1.0Al$_2$O$_3$:2.4P$_2$O$_5$:4.8R:190H$_2$O The synthetic mother liquor was crystallized in a sealed reaction vessel at a crystallization temperature of 190° C. for 60 hours, the resulting crystallized product was washed and dried to obtain a silicoaluminophosphate molecular sieve precursor, wherein the precursor had a molar ratio of phosphorus, calculated as P$_2$O$_5$, to aluminum, calculated as Al$_2$O$_3$, (i.e. P$_2$O$_5$/Al$_2$O$_3$), of 0.96, a molar ratio of silicon, calculated as SiO$_2$, to aluminum, calculated as Al$_2$O$_3$, (i.e. SiO$_2$/Al$_2$O$_3$), of 0.089, a content by weight of the organic material of 29.4%, and the XRD data as shown in Table 9A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3=0.089$ and a phosphorus pentoxide to alumina ratio $P_2O_5/Al_2O_3=0.96$ (i.e. a schematic chemical composition of 0.089 $SiO_2 \cdot Al_2O_3 \cdot 0.96$ $P_2O_5$) as determined by inductively coupled plasma-atomic emission spectroscopy (ICP), a specific surface area of 310 m$^2$/g, a micropore volume of 0.21 ml/g, and the XRD data as shown in Table 9B.

TABLE 9A

XRD data of the silicoaluminophosphate molecular sieve precursor obtained in Example 9

| 2 theta (°) | Interplanar spacing (Å) | Relative intensity ($I/I_0$) × 100 |
|---|---|---|
| 8.21 | 10.77 | 40.4 |
| 13.40 | 6.60 | 28.2 |
| 14.12 | 6.27 | 4.3 |
| 15.80 | 5.60 | 67.4 |
| 16.71 | 5.30 | 13.9 |
| 19.58 | 4.53 | 11.8 |
| 20.85 | 4.26 | 100 |
| 21.56 | 4.12 | 12.7 |
| 22.25 | 3.99 | 34.9 |
| 23.46 | 3.79 | 35.3 |
| 23.88 | 3.72 | 15.2 |
| 25.13 | 3.54 | 12.3 |
| 25.53 | 3.49 | 20.4 |
| 27.18 | 3.28 | 22.3 |
| 29.54 | 3.02 | 19.3 |

TABLE 9B

XRD data of the silicoaluminophosphate molecular sieves obtained in Example 9

| 2 theta (°) | Interplanar spacing (Å) | Relative intensity ($I/I_0$) × 100 |
|---|---|---|
| 8.52 | 10.37 | 100 |
| 13.82 | 6.40 | 91.5 |
| 14.06 | 6.29 | 19.2 |
| 16.22 | 5.46 | 21.3 |
| 16.52 | 5.36 | 20.8 |
| 17.37 | 5.10 | 4.6 |
| 19.73 | 4.50 | 5.7 |
| 21.33 | 4.16 | 31.6 |
| 21.80 | 4.07 | 31.1 |
| 22.24 | 3.99 | 3.6 |
| 24.00 | 3.70 | 17.1 |
| 24.56 | 3.62 | 17.9 |
| 25.68 | 3.47 | 11.8 |
| 27.76 | 3.21 | 12.3 |
| 28.26 | 3.15 | 5.0 |
| 29.42 | 3.03 | 15.1 |

Example 10

20.7 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.026 g of tetraethyl orthosilicate were added thereto while stirring, then 2.30 g of 85% phosphoric acid solution was slowly added dropwise, and stirred uniformly to obtain a synthetic mother liquor having the following composition expressed in molar ratio:

0.03 $SiO_2$:1.0$Al_2O_3$:2.4$P_2O_5$:3.6R:150$H_2O$

The synthetic mother liquor was crystallized in a sealed reaction vessel at a crystallization temperature of 190° C. for 48 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.99, a molar ratio of silicon, calculated as $SiO_2$, to aluminum, calculated as $Al_2O_3$, (i.e. $SiO_2/Al_2O_3$), of 0.028, a content by weight of the organic material of 20.5%, and the XRD data as shown in Table 10A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3$=0.028 and a phosphorus pentoxide to alumina ratio $P_2O_5/Al_2O_3$=0.99 (i.e. a schematic chemical composition of 0.028 $SiO_2 \cdot Al_2O_3 \cdot 0.99$ $P_2O_5$) as determined by inductively coupled plasma-atomic emission spectroscopy (ICP), a specific surface area of 280 $m^2/g$, a micropore volume of 0.19 ml/g, and the XRD data as shown in Table 10B.

TABLE 10A

XRD data of the silicoaluminophosphate molecular sieve precursor obtained in Example 10

| 2 theta (°) | Interplanar spacing (Å) | Relative intensity ($I/I_0$) × 100 |
|---|---|---|
| 8.29 | 10.66 | 79.1 |
| 13.48 | 6.56 | 30.5 |
| 14.21 | 6.23 | 4.9 |
| 15.89 | 5.57 | 73.6 |
| 16.79 | 5.28 | 13.4 |
| 19.69 | 4.51 | 11.9 |
| 20.94 | 4.24 | 100 |
| 21.62 | 4.11 | 21.8 |
| 22.37 | 3.97 | 31.3 |
| 23.57 | 3.77 | 38.0 |
| 23.99 | 3.71 | 15.0 |
| 25.22 | 3.53 | 9.2 |
| 25.65 | 3.47 | 16.4 |
| 27.29 | 3.26 | 21.9 |
| 29.66 | 3.01 | 15.8 |

TABLE 10B

XRD data of the silicoaluminophosphate molecular sieve obtained in Example 10

| 2 theta (°) | Interplanar spacing (Å) | Relative intensity ($I/I_0$) × 100 |
|---|---|---|
| 8.48 | 10.41 | 98.9 |
| 13.80 | 6.41 | 100 |
| 14.03 | 6.31 | 23.5 |
| 16.19 | 5.47 | 22.6 |
| 16.49 | 5.37 | 23.5 |
| 17.34 | 5.11 | 5.1 |
| 19.70 | 4.50 | 6.5 |
| 21.30 | 4.17 | 35.0 |
| 21.77 | 4.08 | 36.3 |
| 22.20 | 4.00 | 3.9 |
| 23.97 | 3.71 | 18.7 |
| 24.53 | 3.63 | 20.8 |
| 25.65 | 3.47 | 12.2 |
| 27.74 | 3.21 | 13.9 |
| 28.24 | 3.16 | 5.6 |
| 29.39 | 3.04 | 16.0 |

Example 11

20.7 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.069 g of tetraethyl orthosilicate were added thereto while stirring, then 2.30 g of 85% phosphoric acid solution was slowly added dropwise, and stirred uniformly to obtain a synthetic mother liquor having the following composition expressed in molar ratio:

0.08$SiO_2$:1.0$Al_2O_3$:2.4$P_2O_5$:3.6R:150$H_2O$

The synthetic mother liquor was crystallized in a sealed reaction vessel at a crystallization temperature of 190° C. for 60 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.97, a molar ratio of silicon, calculated as $SiO_2$, to aluminum, calculated as $Al_2O_3$, (i.e. $SiO_2/Al_2O_3$), of 0.079, a content by weight of the organic material of 24.2%, and the XRD data as shown in Table 11A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3$=0.079 and a phosphorus pentoxide to alumina ratio $P_2O_5/Al_2O_3$=0.97 (i.e. a schematic chemical composition of 0.079 $SiO_2 \cdot Al_2O_3 \cdot 0.97$ $P_2O_5$) as determined by inductively coupled plasma-atomic emission spectroscopy (ICP), a specific surface area of 380 $m^2/g$, a micropore volume of 0.17 ml/g, and the XRD data as shown in Table 11B.

TABLE 11A

XRD data of the silicoaluminophosphate molecular sieve precursor obtained in Example 11

| 2 theta (°) | Interplanar spacing (Å) | Relative intensity ($I/I_0$) × 100 |
|---|---|---|
| 8.22 | 10.75 | 51.3 |
| 13.42 | 6.59 | 28.8 |
| 14.13 | 6.26 | 6.4 |
| 15.81 | 5.60 | 67.8 |
| 16.73 | 5.29 | 16.8 |
| 19.59 | 4.53 | 13.3 |
| 20.86 | 4.26 | 100 |
| 21.56 | 4.12 | 20.5 |
| 22.26 | 3.99 | 46.4 |
| 23.47 | 3.79 | 38.1 |
| 23.89 | 3.72 | 19.9 |
| 25.13 | 3.54 | 15.8 |
| 25.53 | 3.48 | 20.3 |
| 27.20 | 3.28 | 23.8 |
| 29.55 | 3.02 | 23.6 |

TABLE 11B

XRD data of the silicoaluminophosphate
molecular sieve obtained in Example 11

| 2 theta (°) | Interplanar spacing (Å) | Relative intensity $(I/I_0) \times 100$ |
|---|---|---|
| 8.43 | 10.48 | 100 |
| 13.74 | 6.44 | 89.9 |
| 13.96 | 6.34 | 22.5 |
| 16.15 | 5.48 | 19.1 |
| 16.44 | 5.39 | 22.8 |
| 17.28 | 5.13 | 4.5 |
| 19.66 | 4.51 | 5.9 |
| 21.26 | 4.18 | 27.5 |
| 21.72 | 4.09 | 30.7 |
| 22.16 | 4.01 | 3.7 |
| 23.94 | 3.71 | 14.8 |
| 24.47 | 3.63 | 16.4 |
| 25.61 | 3.48 | 9.9 |
| 27.71 | 3.22 | 10.1 |
| 28.20 | 3.16 | 5.1 |
| 29.35 | 3.04 | 13.2 |

Example 12

34.5 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.026 g of tetraethyl orthosilicate were added thereto while stirring, then 2.30 g of 85% phosphoric acid solution was slowly added dropwise, and stirred uniformly to obtain a synthetic mother liquor having the following composition expressed in molar ratio:

$0.03SiO_2:1.0Al_2O_3:2.4P_2O_5:6.0R:260H_2O$

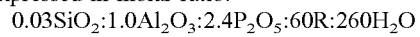

The synthetic mother liquor was crystallized in a sealed reaction vessel at a crystallization temperature of 190° C. for 48 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.99, a molar ratio of silicon, calculated as $SiO_2$, to aluminum, calculated as $Al_2O_3$, (i.e. $SiO_2/Al_2O_3$), of 0.026, a content by weight of the organic material of 27.2%, and the XRD data as shown in Table 12A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3=0.026$ and a phosphorus pentoxide to alumina ratio $P_2O_5/Al_2O_3=0.99$ (i.e. a schematic chemical composition of 0.026 $SiO_2 \cdot Al_2O_3 \cdot 0.99$ $P_2O_5$) as determined by inductively coupled plasma-atomic emission spectroscopy (ICP), a specific surface area of 315 m$^2$/g, a micropore volume of 0.18 ml/g, and the XRD data as shown in Table 12B.

TABLE 12A

XRD data of the silicoaluminophosphate molecular
sieve precursor obtained in Example 12

| 2 theta (°) | Interplanar spacing (Å) | Relative intensity $(I/I_0) \times 100$ |
|---|---|---|
| 8.28 | 10.66 | 43.3 |
| 13.49 | 6.56 | 24.9 |
| 14.20 | 6.23 | 4.8 |
| 15.87 | 5.58 | 62.3 |
| 16.78 | 5.28 | 15.1 |
| 17.30 | 5.12 | 2.5 |
| 19.66 | 4.51 | 11.6 |
| 20.92 | 4.24 | 100 |
| 21.63 | 4.10 | 14.2 |
| 22.33 | 3.98 | 40.3 |
| 23.53 | 3.78 | 39.5 |
| 23.96 | 3.71 | 18.4 |
| 25.20 | 3.53 | 13.7 |
| 25.61 | 3.48 | 21.4 |
| 27.26 | 3.27 | 23.7 |
| 29.61 | 3.01 | 19.5 |

TABLE 12B

XRD data of the silicoaluminophosphate
molecular sieve obtained in Example 12

| 2 theta (°) | Interplanar spacing (Å) | Relative intensity $(I/I_0) \times 100$ |
|---|---|---|
| 8.48 | 10.42 | 66.3 |
| 13.88 | 6.37 | 100 |
| 14.08 | 6.28 | 14.7 |
| 16.30 | 5.43 | 19.7 |
| 16.50 | 5.37 | 19.4 |
| 17.29 | 5.12 | 5.7 |
| 19.78 | 4.48 | 8.9 |
| 21.50 | 4.13 | 27.6 |
| 21.80 | 4.07 | 35.4 |
| 22.26 | 3.99 | 4.4 |
| 24.18 | 3.68 | 30.0 |
| 24.57 | 3.62 | 19.2 |
| 25.82 | 3.45 | 25.2 |
| 27.94 | 3.19 | 21.0 |
| 28.34 | 3.15 | 10.1 |
| 29.53 | 3.02 | 28.5 |

Example 13

34.5 g of 20.75% 1,1-[1,4-phenylenebis(methylene)]bis-1-methylpyrrolidinium dihydroxide (hereinafter referred to as R) solution was weighed, 0.698 g of pseudo-boehmite and 0.043 g of tetraethyl orthosilicate were added thereto while stirring, then 2.30 g of 85% phosphoric acid solution was slowly added dropwise, and stirred uniformly to obtain a synthetic mother liquor having the following composition expressed in molar ratio:

$0.05SiO_2:1.0Al_2O_3:2.4P_2O_5:6.0R:260H_2O$

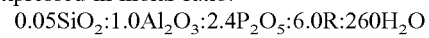

The synthetic mother liquor was crystallized in a sealed reaction vessel at a crystallization temperature of 190° C. for 48 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.98, a molar ratio of silicon, calculated as $SiO_2$, to aluminum, calculated as $Al_2O_3$, (i.e. $SiO_2/Al_2O_3$), of 0.045, a content by weight of the organic material of 21.3%, and the XRD data as shown in Table 13A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3=0.045$ and a phosphorus pentoxide to alumina ratio $P_2O_5/Al_2O_3=0.98$ (i.e. a schematic chemical composition of 0.045 $SiO_2 \cdot Al_2O_3 \cdot 0.98$ $P_2O_5$) as determined by inductively coupled plasma-atomic emission spectroscopy (ICP), a specific surface area of 268 m²/g, a micropore volume of 0.20 ml/g, and the XRD data as shown in Table 13B.

TABLE 13A

XRD data of the silicoaluminophosphate molecular sieve precursor obtained in Example 13

| 2 theta (°) | Interplanar spacing (Å) | Relative intensity (I/I₀) × 100 |
|---|---|---|
| 8.35 | 10.58 | 65.6 |
| 13.56 | 6.52 | 28.9 |
| 14.03 | 6.30 | 4.9 |
| 15.96 | 5.55 | 67.7 |
| 16.86 | 5.25 | 13.3 |
| 19.76 | 4.49 | 12.1 |
| 21.02 | 4.22 | 100 |
| 21.73 | 4.09 | 14.8 |
| 22.41 | 3.96 | 38.8 |
| 23.64 | 3.76 | 34.8 |
| 24.06 | 3.70 | 16.9 |
| 25.30 | 3.52 | 11.9 |
| 25.71 | 3.46 | 19.7 |
| 27.37 | 3.26 | 19.6 |
| 29.72 | 3.00 | 16.6 |

TABLE 13B

XRD data of the silicoaluminophosphate molecular sieve obtained in Example 13

| 2 theta (°) | Interplanar spacing (Å) | Relative intensity (I/I₀) × 100 |
|---|---|---|
| 8.52 | 10.37 | 83.2 |
| 13.89 | 6.37 | 100 |
| 14.04 | 6.30 | 17.8 |
| 16.30 | 5.43 | 14.9 |
| 16.54 | 5.35 | 17.3 |
| 17.38 | 5.10 | 3.0 |
| 19.81 | 4.48 | 6.0 |
| 21.51 | 4.13 | 21.0 |
| 21.83 | 4.07 | 24.3 |
| 22.31 | 3.98 | 4.0 |
| 24.21 | 3.67 | 22.3 |
| 24.61 | 3.61 | 13.0 |
| 25.86 | 3.44 | 17.0 |
| 28.00 | 3.18 | 16.7 |
| 28.35 | 3.14 | 6.5 |
| 29.59 | 3.02 | 17.5 |

Example 14

27.6 g of 20.75% 1,1-[1,4-phenylenebis(methylene)]bis-1-methylpyrrolidinium dihydroxide (hereinafter referred to as R) solution was weighed, 0.86 g of aluminum isopropoxide and 0.026 g of tetraethyl orthosilicate were added thereto while stirring, then 2.30 g of 85% phosphoric acid solution was slowly added dropwise, and stirred uniformly to obtain a synthetic mother liquor having the following composition expressed in molar ratio:

0.03SiO₂:1.0Al₂O₃:2.4P₂O₅:4.8R:190H₂O

The synthetic mother liquor was crystallized in a sealed reaction vessel at a crystallization temperature of 190° C. for 60 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.99, a molar ratio of silicon, calculated as $SiO_2$, to aluminum, calculated as $Al_2O_3$, (i.e. $SiO_2/Al_2O_3$), of 0.030, a content by weight of the organic material of 34.1%, and the XRD data as shown in Table 14A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3$=0.03 and a phosphorus pentoxide to alumina ratio $P_2O_5/Al_2O_3$=0.99 (i.e. a schematic chemical composition of 0.03 $SiO_2·Al_2O_3·0.99$ $P_2O_5$) as determined by inductively coupled plasma-atomic emission spectroscopy (ICP), a specific surface area of 310 m²/g, a micropore volume of 0.17 ml/g, and the XRD data as shown in Table 14B.

TABLE 14A

XRD data of the silicoaluminophosphate molecular sieve precursor obtained in Example 14

| 2 theta (°) | Interplanar spacing (Å) | Relative intensity (I/I₀) × 100 |
|---|---|---|
| 8.24 | 10.72 | 40.0 |
| 13.45 | 6.58 | 28.6 |
| 14.15 | 6.25 | 6.0 |
| 15.85 | 5.58 | 69.4 |
| 16.76 | 5.29 | 22.0 |
| 19.65 | 4.51 | 14.1 |
| 20.91 | 4.24 | 100 |
| 21.61 | 4.11 | 20.5 |
| 22.31 | 3.98 | 56.1 |
| 23.53 | 3.78 | 34.7 |
| 23.94 | 3.71 | 18.3 |
| 25.20 | 3.53 | 19.5 |
| 25.61 | 3.48 | 20.8 |
| 27.25 | 3.27 | 21.1 |
| 29.62 | 3.01 | 22.0 |

TABLE 14B

XRD data of the silicoaluminophosphate molecular sieve obtained in Example 14

| 2 theta (°) | Interplanar spacing (Å) | Relative intensity (I/I₀) × 100 |
|---|---|---|
| 8.49 | 10.41 | 63.5 |
| 13.90 | 6.37 | 100 |
| 14.05 | 6.30 | 16.5 |
| 16.31 | 5.43 | 20.1 |
| 16.51 | 5.36 | 16.9 |
| 17.38 | 5.10 | 2.3 |
| 19.82 | 4.48 | 6.6 |
| 21.49 | 4.13 | 23.4 |
| 21.80 | 4.07 | 23.1 |
| 24.17 | 3.68 | 22.3 |
| 24.59 | 3.62 | 11.7 |
| 25.87 | 3.44 | 19.6 |
| 27.98 | 3.18 | 16.2 |
| 28.37 | 3.14 | 8.2 |
| 29.58 | 3.02 | 21.1 |

Example 15

27.6 g of 20.75% 1,1-[1,4-phenylenebis(methylene)]bis-1-methylpyrrolidinium dihydroxide (hereinafter referred to as R) solution was weighed, 0.86 g of aluminum isopropoxide and 0.026 g of tetraethyl orthosilicate were added thereto while stirring, then 2.30 g of 85% phosphoric acid solution was slowly added dropwise, and stirred uniformly to obtain a synthetic mother liquor having the following composition expressed in molar ratio:

0.03SiO₂:1.0Al₂O₃:2.4P₂O₅:4.8R:190H₂O

The above synthetic mother liquor was crystallized in a sealed reaction vessel at a crystallization temperature of 150° C. for 84 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.98, a molar ratio of silicon, calculated as $SiO_2$, to aluminum, calculated as $Al_2O_3$, (i.e. $SiO_2/Al_2O_3$), of 0.032, a content by weight of the organic material of 28.8%, and the XRD data as shown in Table 15A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3=0.032$ and a phosphorus pentoxide to alumina ratio $P_2O_5/Al_2O_3=0.98$ (i.e. a schematic chemical composition of $0.032\ SiO_2 \cdot Al_2O_3 \cdot 0.98\ P_2O_5$) as determined by inductively coupled plasma-atomic emission spectroscopy (ICP), a specific surface area of 212 m$^2$/g, a micropore volume of 0.15 ml/g, and the XRD data are shown in Table 15B.

TABLE 15A

XRD data of the silicoaluminophosphate molecular sieve precursor obtained in Example 15

| 2 theta (°) | Interplanar spacing (Å) | Relative intensity $(I/I_0) \times 100$ |
|---|---|---|
| 8.26 | 10.69 | 44.2 |
| 13.47 | 6.56 | 28.8 |
| 14.18 | 6.23 | 2.4 |
| 15.88 | 5.58 | 69.2 |
| 16.76 | 5.28 | 9.5 |
| 19.67 | 4.51 | 10.5 |
| 20.93 | 4.24 | 100 |
| 21.61 | 4.11 | 20.3 |
| 22.30 | 3.98 | 23.4 |
| 23.54 | 3.78 | 39.3 |
| 23.97 | 3.71 | 14.6 |
| 25.16 | 3.54 | 7.7 |
| 25.62 | 3.47 | 17.1 |
| 27.28 | 3.27 | 21.7 |
| 29.60 | 3.01 | 13.8 |

TABLE 15B

XRD data of the silicoaluminophosphate molecular sieve obtained in Example 15

| 2 theta (°) | Interplanar spacing (Å) | Relative intensity $(I/I_0) \times 100$ |
|---|---|---|
| 8.49 | 10.40 | 64.1 |
| 13.87 | 6.38 | 100 |
| 14.04 | 6.30 | 14.8 |
| 16.29 | 5.44 | 15.5 |
| 16.52 | 5.36 | 14.7 |
| 17.33 | 5.11 | 2.0 |
| 19.81 | 4.48 | 4.8 |
| 21.47 | 4.14 | 21.9 |
| 21.81 | 4.07 | 20.4 |
| 22.29 | 3.98 | 2.9 |
| 24.17 | 3.68 | 21.8 |
| 24.57 | 3.62 | 10.8 |
| 25.82 | 3.45 | 12.6 |
| 27.98 | 3.19 | 17.7 |
| 28.32 | 3.15 | 5.5 |
| 29.55 | 3.02 | 18.6 |

Example 16

27.6 g of 20.75% 1,1-[1,4-phenylenebis(methylene)]bis-1-methylpyrrolidinium dihydroxide (hereinafter referred to as R) solution was weighed, 0.86 g of aluminum isopropoxide and 0.021 ml of a 30% Ludox LS-30 solution were added thereto while stirring, then 2.30 g of 85% phosphoric acid solution was slowly added dropwise, and stirred uniformly to obtain a synthetic mother liquor having the following composition expressed in molar ratio:

$0.03SiO_2:1.0Al_2O_3:2.4P_2O_5:4.8R:190H_2O$

The synthetic mother liquor was crystallized in a sealed reaction vessel at a crystallization temperature of 190° C. for 60 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 1.0, a molar ratio of silicon, calculated as $SiO_2$, to aluminum, calculated as $Al_2O_3$, (i.e. $SiO_2/Al_2O_3$), of 0.030, a content by weight of the organic material of 25.2%, and the XRD data as shown in Table 16A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3=0.030$ and a phosphorus pentoxide to alumina ratio $P_2O_5/Al_2O_3=1.00$ (i.e. a schematic chemical composition of $0.030\ SiO_2 \cdot Al_2O_3 \cdot 1.00\ P_2O_5$) as determined by inductively coupled plasma-atomic emission spectroscopy (ICP), a specific surface area of 336 m$^2$/g, a micropore volume of 0.20 ml/g, and the XRD data as shown in Table 16B.

TABLE 16A

XRD data of the silicoaluminophosphate molecular sieve precursor obtained in Example 16

| 2 theta (°) | Interplanar spacing (Å) | Relative intensity $(I/I_0) \times 100$ |
|---|---|---|
| 8.31 | 10.63 | 45.1 |
| 13.52 | 6.54 | 29.3 |
| 14.23 | 6.22 | 3.2 |
| 15.92 | 5.56 | 71.4 |
| 16.82 | 5.26 | 9.0 |
| 19.70 | 4.50 | 10.6 |
| 20.97 | 4.23 | 100 |
| 21.69 | 4.09 | 20.3 |
| 22.40 | 3.96 | 28.4 |
| 23.60 | 3.77 | 40.1 |
| 24.01 | 3.70 | 14.5 |
| 25.26 | 3.52 | 8.9 |
| 25.68 | 3.47 | 19.7 |
| 27.33 | 3.26 | 22.6 |
| 29.69 | 3.01 | 17.4 |

TABLE 16B

XRD data of the silicoaluminophosphate molecular sieve obtained in Example 16

| 2 theta (°) | Interplanar spacing (Å) | Relative intensity $(I/I_0) \times 100$ |
|---|---|---|
| 8.52 | 10.37 | 73.2 |
| 13.92 | 6.35 | 100 |
| 14.09 | 6.28 | 21.0 |
| 16.36 | 5.41 | 15.2 |
| 16.59 | 5.34 | 22.8 |
| 17.42 | 5.08 | 3.8 |
| 19.87 | 4.46 | 6.1 |
| 21.53 | 4.12 | 21.5 |
| 21.89 | 4.06 | 33.9 |
| 22.35 | 3.97 | 5.4 |
| 24.23 | 3.67 | 22.2 |
| 24.66 | 3.61 | 18.5 |
| 25.87 | 3.44 | 14.6 |
| 28.03 | 3.18 | 15.0 |

TABLE 16B-continued

XRD data of the silicoaluminophosphate
molecular sieve obtained in Example 16

| 2 theta (°) | Interplanar spacing (Å) | Relative intensity $(I/I_0) \times 100$ |
|---|---|---|
| 28.43 | 3.14 | 8.8 |
| 29.62 | 3.01 | 23.1 |

Example 17

27.6 g of 20.75% 1,1-[1,4-phenylenebis(methylene)]bis-1-methylpyrrolidinium dihydroxide (hereinafter referred to as R) solution was weighed, 0.86 g of aluminum isopropoxide and 0.021 ml of a 30% Ludox LS-30 solution were added thereto while stirring, then 2.30 g of 85% phosphoric acid solution was slowly added dropwise, and stirred uniformly to obtain a synthetic mother liquor having the following composition expressed in molar ratio:

$0.03SiO_2:1.0Al_2O_3:2.4P_2O_5:4.8R:190H_2O$

The synthetic mother liquor was crystallized in a sealed reaction vessel at a crystallization temperature of 150° C. for 120 hours, the resulting crystallized product was washed and dried to obtain a silicoaluminophosphate molecular sieve precursor, wherein the precursor had a molar ratio of phosphorus, calculated as $P_2O_5$, to aluminum, calculated as $Al_2O_3$, (i.e. $P_2O_5/Al_2O_3$), of 0.99, a molar ratio of silicon, calculated as $SiO_2$, to aluminum, calculated as $Al_2O_3$, (i.e. $SiO_2/Al_2O_3$), of 0.029, a content by weight of the organic material of 20.6%, and the XRD data as shown in Table 17A. The silicoaluminophosphate molecular sieve precursor was calcined at 550° C. for 5 hours to obtain a silicoaluminophosphate molecular sieve, the product molecular sieve had a silica to alumina ratio $SiO_2/Al_2O_3=0.029$ and a phosphorus pentoxide to alumina ratio $P_2O_5/Al_2O_3=0.99$ (i.e. a schematic chemical composition of $0.029\ SiO_2 \cdot Al_2O_3 \cdot 0.99\ P_2O_5$) as determined by inductively coupled plasma-atomic emission spectroscopy (ICP), a specific surface area of 290 m²/g, a micropore volume of 0.17 ml/g, and the XRD data as shown in Table 17B.

TABLE 17A

XRD data of the silicoaluminophosphate molecular
sieve precursor obtained in Example 17

| 2 theta (°) | Interplanar spacing (Å) | Relative intensity $(I/I_0) \times 100$ |
|---|---|---|
| 8.20 | 10.77 | 47.8 |
| 13.42 | 6.59 | 27.3 |
| 14.13 | 6.26 | 5.0 |
| 15.82 | 5.60 | 66.7 |
| 16.72 | 5.30 | 16.9 |
| 19.60 | 4.53 | 15.4 |
| 20.87 | 4.25 | 100 |
| 21.55 | 4.12 | 24.2 |
| 22.24 | 3.99 | 48.5 |
| 23.50 | 3.78 | 42.4 |
| 23.91 | 3.72 | 17.5 |
| 25.14 | 3.54 | 15.1 |
| 25.55 | 3.48 | 23.8 |
| 27.24 | 3.27 | 21.0 |
| 29.53 | 3.02 | 21.5 |

TABLE 17B

XRD data of the silicoaluminophosphate
molecular sieve obtained in Example 17

| 2 theta (°) | Interplanar spacing (Å) | Relative intensity $(I/I_0) \times 100$ |
|---|---|---|
| 8.57 | 10.31 | 70.2 |
| 13.97 | 6.33 | 100 |
| 14.10 | 6.28 | 16.1 |
| 16.39 | 5.40 | 15.2 |
| 16.61 | 5.33 | 16.5 |
| 17.42 | 5.09 | 2.2 |
| 19.90 | 4.46 | 5.4 |
| 21.59 | 4.11 | 21.0 |
| 21.90 | 4.05 | 23.3 |
| 22.40 | 3.97 | 3.6 |
| 24.27 | 3.66 | 21.8 |
| 24.66 | 3.60 | 12.2 |
| 25.94 | 3.43 | 13.7 |
| 28.08 | 3.17 | 15.9 |
| 28.44 | 3.13 | 5.0 |
| 29.65 | 3.01 | 19.3 |

Example 18

2 g sample of the powder obtained in Example 2 was mixed thoroughly with 3 g of alumina and 0.2 g of sesbania powder, and then 5 ml of 5 wt % nitric acid was added to the mixture, kneaded and extruded into a bar of φ1.6×2 mm, and the bar was dried at 110° C. and calcined at 550° C. for 8 hours in an air atmosphere to obtain a molecular sieve composition. The molecular sieve composition can be used as an adsorbent or a catalyst.

Example 19

The molecular sieve composition obtained in Example 18 was crushed and sieved, 1 g of particles between 20 and 40 mesh were loaded in a fixed bed reactor, activated for 1 h at 500° C. in nitrogen atmosphere and then cooled to a reaction temperature of 460° C. Methanol was introduced at a flow rate of 0.125 ml/min and nitrogen was introduced at a flow rate of 10 ml/min. The methanol was passed through the molecular sieve composition bed for conversion reaction, and the mixture obtained after the reaction was directly sent to a gas chromatography for analysis. After 60 minutes of reaction, the ethylene yield was 51.44%, the propylene yield was 22.59%, the total yield of C4 and C5 was 11.4%, and the conversion rate of methanol was 100%.

Comparative Example 1

2 g of SAPO-34 molecular sieve was mixed thoroughly with 3 g of alumina and 0.2 g of sesbania powder, and then 5 ml of 5 wt % nitric acid was added to the mixture, kneaded and extruded into a bar of φ1.6×2 mm, and the bar was dried at 110° C. and calcined at 550° C. for 8 hours in an air atmosphere to obtain a molecular sieve composition.

The molecular sieve composition obtained was crushed and sieved, 1 g of particles between 20 and 40 mesh were loaded in a fixed bed reactor, activated for 1 h at 500° C. in nitrogen atmosphere and then cooled to a reaction temperature of 460° C. Methanol was introduced at a flow rate of 0.125 ml/min and nitrogen was introduced at a flow rate of 10 ml/min. The methanol was passed through the molecular sieve composition bed for conversion reaction, and the mixture obtained after the reaction was directly sent to a gas chromatography for analysis. After 60 minutes of reaction, the ethylene yield was 48.83%, the propylene yield was 31.56%, the total yield of C4 and C5 was 9.9%, and the conversion rate of methanol was 100%.

As can be seen from a comparison of Example 19 with Comparative Example 1, the molecular sieve/molecular sieve composition of the present application can significantly improve the yield of ethylene when used in catalyzing the conversion of methanol to ethylene.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. A silicoaluminophosphate molecular sieve having a schematic chemical composition, expressed on a molar basis, of $mSiO_2 \cdot Al_2O_3 \cdot nP_2O_5$, wherein m represents the molar ratio of $SiO_2$ to $Al_2O_3$ and is in a range of about 0.005 to about 0.15, n represents the molar ratio of $P_2O_5$ to $Al_2O_3$ and is in a range of about 0.7 to about 1.1, wherein the molecular sieve has an X-ray diffraction pattern exhibiting a relative intensity profile as shown in the following table:

| 2 theta (°) | Interplanar spacing (Å) | Relative intensity $(I/I_0) \times 100$ |
| --- | --- | --- |
| 8.30-8.60 | 10.27-10.64 | VS |
| 13.67-14.00 | 6.32-6.44 | VS |
| 16.15-16.39 | 5.40-5.48 | W-M |
| 16.41-16.61 | 5.33-5.40 | W-M |
| 21.26-21.59 | 4.11-4.18 | M |
| 21.62-21.90 | 4.05-4.10 | M-S |
| 23.94-24.33 | 3.65-3.71 | W-M. |

2. The silicoaluminophosphate molecular sieve according to claim 1, wherein said molecular sieve has an X-ray diffraction pattern exhibiting a relative intensity profile as shown in the following table:

| 2 theta (°) | Interplanar spacing (Å) | Relative intensity $(I/I_0) \times 100$ |
| --- | --- | --- |
| 8.30-8.60 | 10.27-10.64 | VS |
| 13.67-14.00 | 6.32-6.44 | VS |
| 16.15-16.39 | 5.40-5.48 | W-M |
| 16.41-16.61 | 5.33-5.40 | W-M |
| 21.26-21.59 | 4.11-4.18 | M |
| 21.62-21.90 | 4.05-4.10 | M-S |
| 23.94-24.33 | 3.65-3.71 | W-M |
| 24.35-24.66 | 3.60-3.65 | W-M |
| 25.61-25.97 | 3.43-3.48 | W-M |
| 27.71-28.13 | 3.17-3.22 | W-M |
| 29.35-29.67 | 3.01-3.04 | W-M. |

3. The silicoaluminophosphate molecular sieve according to claim 2, wherein said molecular sieve has an X-ray diffraction pattern exhibiting a relative intensity profile as shown in the following table:

| 2 theta (°) | Interplanar spacing (Å) | Relative intensity $(I/I_0) \times 100$ |
| --- | --- | --- |
| 8.30-8.60 | 10.27-10.64 | VS |
| 13.67-14.00 | 6.32-6.44 | VS |
| 13.94-14.15 | 6.25-6.34 | W-M |
| 16.15-16.39 | 5.40-5.48 | W-M |
| 16.41-16.61 | 5.33-5.40 | W-M |
| 17.13-17.43 | 5.08-5.17 | W |
| 19.62-19.92 | 4.45-4.52 | W |
| 21.26-21.59 | 4.11-4.18 | M |
| 21.62-21.90 | 4.05-4.10 | M-S |
| 22.10-22.40 | 3.96-4.02 | W |
| 23.94-24.33 | 3.65-3.71 | W-M |
| 24.35-24.66 | 3.60-3.65 | W-M |
| 25.61-25.97 | 3.43-3.48 | W-M |
| 27.71-28.13 | 3.17-3.22 | W-M |
| 28.14-28.44 | 3.13-3.17 | W |
| 29.35-29.67 | 3.01-3.04 | W-M. |

4. The silicoaluminophosphate molecular sieve according to claim 1, wherein:
   a molar ratio of $SiO_2$ to $Al_2O_3$ of the molecular sieve is in a range of about 0.01 to about 0.10; and/or
   a molar ratio of $P_2O_5$ to $Al_2O_3$ of the molecular sieve is in a range of about 0.8 to about 1.0.

5. A method for preparing a silicoaluminophosphate molecular sieve according to claim 1, comprising the following steps:
   i) providing a silicoaluminophosphate molecular sieve precursor, wherein the precursor has an X-ray diffraction pattern exhibiting a relative intensity profile as shown in the following table:

| 2 theta (°) | Interplanar spacing (Å) | Relative intensity $(I/I_0) \times 100$ |
| --- | --- | --- |
| 8.15-8.45 | 10.45-10.83 | S-VS |
| 13.36-13.67 | 6.47-6.62 | M-S |
| 15.77-16.07 | 5.51-5.61 | VS |
| 20.80-21.11 | 4.20-4.26 | VS |
| 21.49-21.79 | 4.07-4.13 | M |
| 22.16-22.46 | 3.95-4.01 | M-S |
| 23.42-23.72 | 3.75-3.79 | M, | and
   ii) calcining the silicoaluminophosphate molecular sieve precursor to obtain the silicoaluminophosphate molecular sieve.

6. The method according to claim 5, wherein the silicoaluminophosphate molecular sieve precursor has an X-ray diffraction pattern exhibiting a relative intensity profile as shown in the following Table:

| 2 theta (°) | Interplanar spacing (Å) | Relative intensity $(I/I_0) \times 100$ |
| --- | --- | --- |
| 8.15-8.45 | 10.45-10.83 | S-VS |
| 13.36-13.67 | 6.47-6.62 | M-S |
| 15.77-16.07 | 5.51-5.61 | VS |
| 16.66-16.96 | 5.22-5.31 | W-M |
| 19.51-19.81 | 4.48-4.54 | W-M |
| 20.80-21.11 | 4.20-4.26 | VS |
| 21.49-21.79 | 4.07-4.13 | M |
| 22.16-22.46 | 3.95-4.01 | M-S |
| 23.42-23.72 | 3.75-3.79 | M |
| 25.49-25.79 | 3.45-3.49 | W-M |

-continued

| 2 theta (°) | Interplanar spacing (Å) | Relative intensity ($I/I_0$) × 100 |
|---|---|---|
| 27.14-27.44 | 3.25-3.28 | W-M |
| 29.47-29.77 | 3.00-3.03 | W-M, |

7. The method according to claim 6, wherein the silicoaluminophosphate molecular sieve precursor has an X-ray diffraction pattern exhibiting a relative intensity profile as shown in the following Table:

| 2 theta (°) | Interplanar spacing (Å) | Relative intensity ($I/I_0$) × 100 |
|---|---|---|
| 8.15-8.45 | 10.45-10.83 | S-VS |
| 13.36-13.67 | 6.47-6.62 | M-S |
| 14.03-14.33 | 6.17-6.30 | W |
| 15.77-16.07 | 5.51-5.61 | VS |
| 16.66-16.96 | 5.22-5.31 | W-M |
| 17.11-17.41 | 5.09-5.18 | W |
| 19.51-19.81 | 4.48-4.54 | W-M |
| 20.80-21.11 | 4.20-4.26 | VS |
| 21.49-21.79 | 4.07-4.13 | M |
| 22.16-22.46 | 3.95-4.01 | M-S |
| 23.42-23.72 | 3.75-3.79 | M |
| 23.82-24.12 | 3.68-3.73 | W-M |
| 25.06-25.36 | 3.51-3.55 | W |
| 25.49-25.79 | 3.45-3.49 | W-M |
| 27.14-27.44 | 3.25-3.28 | W-M |
| 29.47-29.77 | 3.00-3.03 | W-M. |

8. The method according to claim 5, wherein the step i) further comprises:
ia) mixing a silicon source, an aluminum source, a phosphorus source, an organic material R and water at a molar ratio of the silicon source (calculated as $SiO_2$):the aluminum source (calculated as $Al_2O_3$):the phosphorus source (calculated as $P_2O_5$):R:$H_2O$ of about (0.01-0.3):1:(1.0-3.0):(3.0-6.0):(50-500) to obtain a synthetic mother liquor; and
ib) subjecting the synthetic mother liquor to crystallization to obtain the silicoaluminophosphate molecular sieve precursor;
wherein the organic material R is an ammonium hydroxide having the following formula:

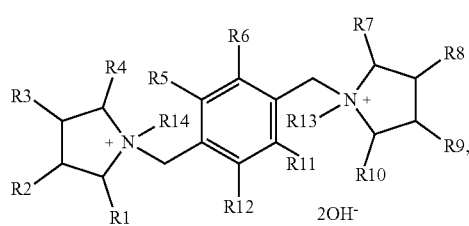

wherein the groups R1-R12, which are identical or different from each other, are independently selected from H and $C_{1-6}$ alkyl groups; and
the groups R13 and R14, which may be identical or different from each other, are independently selected from $C_{1-6}$ alkyl groups.

9. The method according to claim 8, wherein in step ia) the silicon source, the aluminum source, the phosphorus source, the organic material R and water are mixed at a molar ratio of the silicon source (calculated as $SiO_2$):the aluminum source (calculated as $Al_2O_3$):the phosphorus source (calculated as $P_2O_5$):R:$H_2O$ of about (0.01-0.2):1:(1.0-2.0):(3.6-4.8):(100-300).

10. The method according to claim 8, wherein the organic material R is 1,1-[1,4-phenylenebis(methylene)]bis-1-methylpyrrolidinium dihydroxide.

11. The method according to claim 8, wherein the step ib) is carried out under the following conditions:
a sealed reaction vessel, a crystallization temperature of about 140-200° C., and a crystallization time of about 48-160 hours.

12. The method according to claim 11, wherein the step ib) is carried out under the following conditions: a sealed reaction vessel, a crystallization temperature of about 150-190° C., and a crystallization time of about 60-120 hour.

13. The method according to claim 8, wherein in the formula of the organic material R the groups R1-R12, which are identical or different from each other, are independently selected from H and $C_{1-3}$ alkyl groups; and the groups R13 and R14, which are identical or different from each other, are independently selected from $C_{1-3}$ alkyl groups.

14. The method according to claim 5, wherein the aluminum source is one or more selected from the group consisting of pseudo-boehmite, aluminum isopropoxide, aluminum sol, aluminum hydroxide, aluminum sulfate, aluminum chloride and aluminum oxide;
the phosphorus source is one or more selected from the group consisting of phosphoric acid, orthophosphorous acid and phosphorus pentoxide; and/or
the silicon source is one or more selected from the group consisting of silica sol, white carbon black and tetraethyl orthosilicate.

15. The method according to claim 14, wherein the aluminum source is selected from the group consisting of pseudo-boehmite and aluminum isopropoxide;
the phosphorus source is phosphoric acid; and
the silicon source is tetraethyl orthosilicate.

16. The method according to claim 5, wherein the silicoaluminophosphate molecular sieve precursor has a molar ratio of phosphorus, calculated as $P_2O_5$, to aluminum, calculated as $Al_2O_3$, (i.e. $P_2O_5/Al_2O_3$), in a range of about 0.7 to about 1.1, and a molar ratio of silicon, calculated as $SiO_2$, to aluminum, calculated as $Al_2O_3$, in a range of about 0.005 to about 0.15, and,
optionally, the silicoaluminophosphate molecular sieve precursor comprises from about 10 wt % to about 40 wt % of an organic material, based on the weight of the silicoaluminophosphate molecular sieve precursor.

17. A molecular sieve composition comprising the silicoaluminophosphate molecular sieve according to claim 1, and a binder.

18. A method for producing light olefins, comprising contacting a catalyst comprising the aluminophosphate molecular sieve according to claim 1 with methanol, wherein the light olefins comprises ethylene and propylene.

19. A method for removing water from a water-containing material to be dried, comprising: contacting the molecular sieve composition according to claim 14 with the water-containing material, whereby the molecular sieve composition adsorbs water from the water-containing material, wherein the water-containing material is an organic solvent or natural gas.

* * * * *